United States Patent
Taya

(10) Patent No.: US 10,566,841 B2
(45) Date of Patent: Feb. 18, 2020

(54) WIRELESS POWER SUPPLY DEVICE, WIRELESS POWER RECEIVING DEVICE, WIRELESS POWER TRANSMISSION SYSTEM, AND WIRELESS POWER SUPPLY METHOD

(71) Applicant: LAPIS Semiconductor Co., Ltd., Yokohama (JP)

(72) Inventor: Takashi Taya, Yokohama (JP)

(73) Assignee: LAPIS Semiconductor Co., Ltd., Yokohama (JP)

(*) Notice: Subject to any disclaimer, the term of this patent is extended or adjusted under 35 U.S.C. 154(b) by 87 days.

(21) Appl. No.: 15/817,991

(22) Filed: Nov. 20, 2017

(65) Prior Publication Data
US 2018/0145541 A1 May 24, 2018

(30) Foreign Application Priority Data
Nov. 22, 2016 (JP) .................. 2016-227043

(51) Int. Cl.
*H02J 50/12* (2016.01)
*H04B 1/3827* (2015.01)
*H02J 7/02* (2016.01)

(52) U.S. Cl.
CPC .............. *H02J 50/12* (2016.02); *H04B 1/385* (2013.01); *H02J 7/025* (2013.01)

(58) Field of Classification Search
CPC ... H02J 50/12; H02J 7/025; H02J 7/02; H04B 1/385; H04B 1/3827
See application file for complete search history.

(56) References Cited

U.S. PATENT DOCUMENTS

2012/0032632 A1* 2/2012 Soar ................... H01F 38/14
                                                        320/108
2017/0324279 A1* 11/2017 Kang ................... H02J 50/80

FOREIGN PATENT DOCUMENTS

JP          2014-79091 A        5/2014

* cited by examiner

*Primary Examiner* — Robert L Deberadinis
(74) *Attorney, Agent, or Firm* — Rabin & Berdo, P.C.

(57) ABSTRACT

A wireless power supply device that performs alternately a wireless communication operation and a wireless power supply operation. The wireless power supply device includes a transmission coil configured to generate an AC (alternating current) magnetic field, a communication driving circuit configured to supply a communication driving current to the transmission coil for generating the AC magnetic field during only the wireless communication operation, and not the wireless power supply operation, and a power supply driving circuit configured to supply a power supply driving current to the transmission coil for generating the AC magnetic field during both the wireless communication operation and the wireless power supply operation.

14 Claims, 16 Drawing Sheets

WIRELESS POWER SUPPLY DEVICE, WIRELESS POWER RECEIVING DEVICE, WIRELESS POWER TRANSMISSION SYSTEM, AND WIRELESS POWER SUPPLY METHOD

BACKGROUND OF THE INVENTION

Technical Field

The present invention relates to a wireless power supply device, a wireless power receiving device, a wireless power transmission system, and a wireless power supply method.

Background Arts

In recent years, a wireless power transmission system to transmit power in a non-contact manner is proposed as a means to supply power to wearable devices such as watches, IC (integrated circuit) cards, and the like. In such a wireless power transmission system, power is transmitted by disposing a coil of the power transmission device (transmission coil) and a coil of the power receiving device (receiving coil) so as to face each other, and there is a strong demand for a wireless power transmission system that uses an AC magnetic field of 13.56 MHz because it has a great degree of freedom in terms of the positions of the transmission coil and the receiving coil.

In the wireless power transmission system, magnetic field bonding is generated when the power transmission device is located near the power receiving device. Thus, the wireless power transmission system requires information exchange between the power transmission device and the power receiving device unlike the power transmission via a cable, which can prevent the power from being transmitted to a device that is not the intended device by using connectors of a certain shape.

In the wireless power transmission system using an AC magnetic field of 13.56 MHz, information exchange (wireless communication) is performed using the same frequency and the same coil channel as the power supply, but the required power intensity differs between the wireless communication and power supply. Specifically, while the required power for the communication is about 1 mW to 10 mW, power supply needs a wider range of power intensity from 1 mW to 10 W. This makes it difficult to use the same driving circuit for both wireless communication and power supply. In order to solve this problem, a power transmission system is proposed to conduct both signal exchange and power transmission by switching between wireless communication and power supply in a time-division manner (Japanese Patent Application Laid-open Publication No. 2014-79091, for example).

SUMMARY OF THE INVENTION

In the configuration in which the power transmission circuit is switched between communication and power supply in the power transmission device, power can be cut off or clock can be cut off upon switching, which makes it difficult for the power receiving device to operate. For example, a cut-off of the magnetic field or distortion of waveform could cause erroneous operations in communication or information processing in the power receiving device. In order to prevent such erroneous operations, it is necessary to add a storage battery and a clock generating circuit to the power receiving device, which would cause an increase in size or cost. If the load circuit in the power receiving device is a secondary battery, that means that the power receiving device also has the power source, but if this secondary battery is fully discharged, it is not possible to activate the device for power supply. Also, the drastic fluctuation in amplitude of the AC signal would interfere with other devices.

Because of a large difference between the required power for communication and required power for power supply, if the power receiving device has only one power receiving circuit, the power efficiency would be low. However, if the power receiving circuit is provided with a power receiving circuit for communication and a power receiving circuit for power supply and those circuits are switched between each other, in a manner similar to the power transmission device, the power or clock is cut off upon switching, which hinders stable operation.

According to an aspect of the invention, there is provided a wireless power supply device that performs alternately a wireless communication operation and a wireless power supply operation, including a transmission coil configured to generate an AC (alternating current) magnetic field, a power supply driving circuit configured to supply a communication driving current to the transmission coil for generating the AC magnetic field during only the wireless communication operation, and not the wireless power supply operation, and a communication driving circuit configured to supply a power supply driving current to the transmission coil for generating the AC magnetic field during both the wireless communication operation and the wireless power supply operation.

According to an aspect of the invention, there is provided a wireless power receiving device that performs alternately a wireless communication operation and a wireless power receiving operation, including a receiving coil configured to receive an AC (alternating current) magnetic field to thereby obtain an AC voltage, a rectifier circuit configured to rectify the AC voltage, thereby to obtain a DC voltage, a communication stabilizing circuit configured to stabilize the DC voltage, thereby to obtain a communication operation voltage for the wireless communion operation, a power supply stabilizing circuit configured to stabilize the DC voltage, thereby to receive power in the wireless power receiving operation, and a communication control circuit configured to receive the communication operation voltage, to perform the wireless communication operation, and to control the power supply stabilizing circuit.

According to an aspect of the invention, there is provided a wireless power transmission system, including the above-wireless power supply device and the above-wireless power receiving device.

According to another aspect of the invention, there is provided a wireless power receiving device configured to receive a receiving power from a wireless power supply device, including a resonant circuit having a receiving coil configured to receive an AC magnetic field from the wireless power supply device to thereby obtain an AC voltage, and a resonant capacitor, a capacity change circuit configured to change a capacity of the resonant capacitor, a supply line configured to receive a supplied voltage rectified from the AC voltage, and a current voltage measuring circuit configured to measure a current flowing through the supply line and the supplied voltage, thereby to calculate a receiving power, the capacity change circuit changing the capacity of the resonant capacitor based on whether the calculated receiving power exceeds a prescribed threshold range.

According to an aspect of the invention, there is provided a wireless power transmission system that performs alternately a wireless communication operation and a wireless power supply operation, including a wireless power supply device having a transmission coil configured to generate an AC magnetic field, and a communication driving circuit configured to supply a communication driving current to the transmission coil, a current measuring circuit configured to measure the power supply driving current, and the above-wireless power receiving device.

According to an aspect of the invention, there is provided a method of a wireless power supply for a wireless power supply device having a transmission coil, a communication driving circuit configured to supply a communication driving current to the transmission coil, and a power supply driving circuit configured to supply a power supply driving current to the transmission coil, the wireless power supply device performing alternately a wireless communication operation and a wireless power supply operation by generating an AC magnetic field in the transmission coil, including during the wireless communication operation, activating the communication driving circuit to supply the communication driving current to the transmission coil, thereby to generate the AC magnetic field, and deactivating the power supply driving circuit not to supply the power supply driving current to the transmission coil, and during the wireless power supply operation, activating both the communication driving circuit and the power supply driving circuit and supplying the communication driving current and the power supply driving current to the transmission coil to generate the AC magnetic field.

According to the wireless power supply device of the present invention, it is possible to suppress a cut-off of power or clock upon switching between communication and power supply.

DETAILED DESCRIPTION OF THE INVENTION

Figure 1:
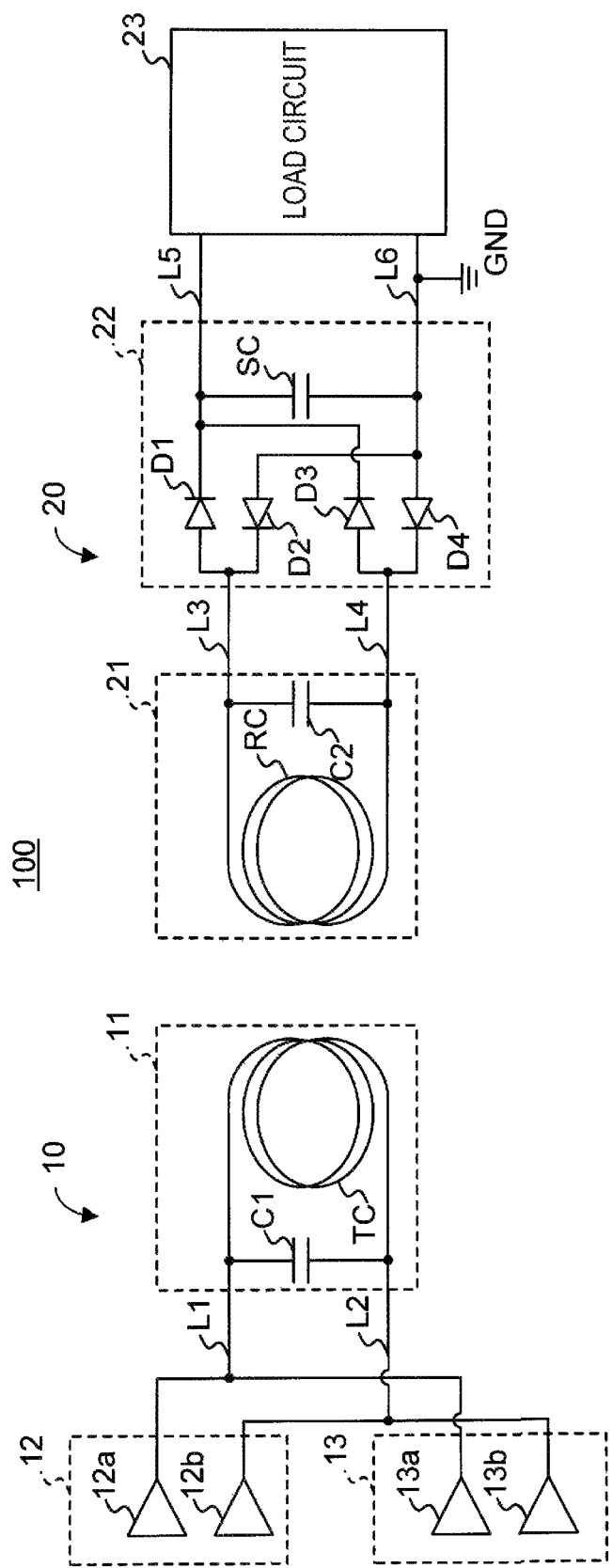
FIG. 1 is a circuit diagram showing the configuration of a wireless power transmission system 100 including a wireless power supply device 10 and a wireless power receiving device 20 of Embodiment 1.

Embodiments of the present invention will be explained below with reference to figures. In the descriptions of respective embodiments below and appended figures, components and parts that are substantially the same or equivalent to each other are given the same reference characters.

Embodiment 1

FIG. 1 is a circuit diagram showing the configuration of a wireless power transmission system 100 including a wireless power supply device 10 and a wireless power receiving device 20 of the present invention. In the wireless power transmission system 100, power is transmitted from the wireless power supply device 10 to the wireless power receiving device 20 by the magnetic bonding between a transmission coil TC in the wireless power supply device 10 and a receiving coil RC in the wireless power receiving device 20.

The wireless power supply device 10 includes a transmission resonant circuit 11, a power supply driving circuit 12, and a communication driving circuit 13.

The transmission resonant circuit 11 includes a resonant capacitor C1 and the transmission coil TC that are connected in parallel. The resonance frequency of the transmission resonant circuit 11 is set to 13.56 MHz, for example, and generates an AC magnetic field when supplied with an AC driving current from the power supply driving circuit 12 and the communication driving circuit 13. To the transmission resonant circuit 11, the power supply driving circuit 12 and the communication driving circuit 13 are connected in parallel.

The power supply driving circuit 12 and the communication driving circuit 13 respectively generate a high-frequency AC driving current of 13.56 MHz, which is substantially the same as the resonance frequency of the transmission resonant circuit 11, and supply the current to the transmission resonant circuit 11 via driving lines L1 and L2, respectively. The power supply driving circuit 12 includes a first driving part 12a and a second driving part 12b. Similarly, the communication driving circuit 13 includes a first driving part 13a and a second driving part 13b.

The wireless power receiving device 20 includes a reception resonant circuit 21, a rectifier circuit 22, and a load circuit 23. The wireless power receiving device 20 extracts a clock signal from the AC magnetic field generated by the wireless power supply device 10, and operates using the extracted clock signal as an operation clock.

The reception resonant circuit 21 includes a resonant capacitor C2 and the receiving coil RC that are connected in parallel. The resonance frequency of the reception resonant circuit 11 is set to 13.56 MHz, for example, and applies, to lines L3 and L4, respectively, an AC voltage having the voltage value corresponding to the voltage value of the AC magnetic field generated by the transmission coil TC of the wireless power supply device 10 when the receiving coil RC and the transmission coil TC were magnetically bonded by the AC magnetic field.

The rectifier circuit 22 includes a diode bridge connected to four rectifying diodes D1 to D4, and a smoothing capacitor SC. The rectifier circuit 22 conducts total wave rectification and smoothing on the AC voltage applied to the lines L3 and L4, thereby generating a DC voltage, and supplies the DC voltage to the load circuit 23 via lines L5 and L6.

The load circuit 23 receives the DC voltage smoothed by the rectifier circuit 22. The load circuit 23 is a charging circuit configured to charge a secondary battery, for example, or a power circuit of various electronic devices such as IC card.

Figure 2:
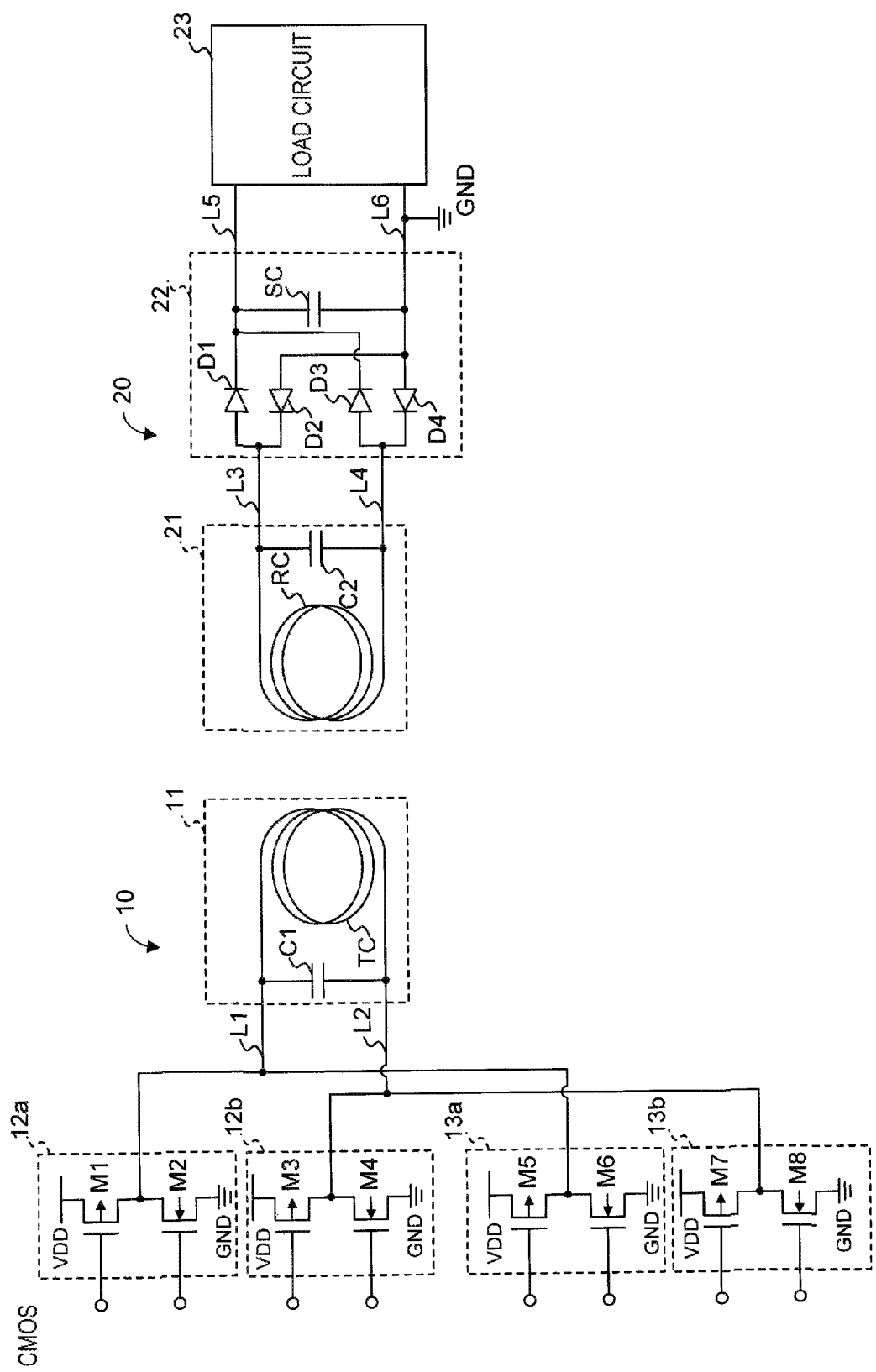
FIG. 2 is a circuit diagram showing the configuration of a wireless power transmission system 100 in a case in which the power supply driving circuit and a communication driving circuit are each made of a CMOS transistor.

FIG. 2 is a diagram showing the configuration of the wireless power transmission system 100 including the wireless power supply device 10 and the wireless power receiving device 20 in a case in which the power supply driving circuit 12 and the communication driving circuit 13 are each made of a CMOS transistor.

The first driving part 12a of the power supply driving circuit 12 is constituted of a PMOS transistor M1 of the first channel type (first conductive type) (will be simply referred to as a transistor M1, below), and an NMOS transistor M2 of the second channel type (second conductive type) (will be simply referred to as a transistor M2 below). A power potential VDD is applied to the source of the transistor M1, and a ground potential GND is applied to the source of the transistor M2. The respective drains of the transistors M1 and M2 are connected to each other, and are also connected to the line L1.

The second driving part 12b of the power supply driving circuit 12 is constituted of a PMOS transistor M3 of the first channel type (first conductive type) (will be simply referred to as a transistor M3, below), and an NMOS transistor M4 of the second channel type (second conductive type) (will be simply referred to as a transistor M4 below). A power potential VDD is applied to the source of the transistor M3, and a ground potential GND is applied to the source of the transistor M4. The respective drains of the transistors M3 and M4 are connected to each other, and are also connected to the line L2.

The first driving part 13a of the communication driving circuit 13 is constituted of a PMOS transistor M5 of the first channel type (first conductive type) (will be simply referred to as a transistor M5, below), and an NMOS transistor M6 of the second channel type (second conductive type) (will be simply referred to as a transistor M6 below). A power potential VDD is applied to the source of the transistor M5, and a ground potential GND is applied to the source of the transistor M6. The respective drains of the transistors M5 and M6 are connected to each other, connected to the respective drains of the transistors M1 and M2, and also connected to the line L1.

The second driving part 13b of the communication driving circuit 13 is constituted of a PMOS transistor M7 of the first channel type (first conductive type) (will be simply referred to as a transistor M7, below), and an NMOS transistor M8 of the second channel type (second conductive type) (will be simply referred to as a transistor M8 below). A power potential VDD is applied to the source of the transistor M7, and a ground potential GND is applied to the source of the transistor M8. The respective drains of the transistors M7 and M8 are connected to each other, connected to the respective drains of the transistors M3 and M4, and also connected to the line L2.

To the respective gates of the transistors M5, M6, M7, and M8 in the communication driving circuit 13, an AC voltage signal (AC voltage amplitude) of 13.56 MHz is applied in both the communication operation and the power supply operation of the wireless power supply device 10.

On the other hand, to the respective gates of the transistors M1, M2, M3, and M4 in the power supply driving circuit 12, different signals (AC voltage amplitude) are applied in the communication operation and the power supply operation of the wireless power supply device. Specifically, in the communication operation, a signal having a fixed value of H-level is supplied to the gates of the transistors M1 and M3, which are the PMOS transistors, and a signal having a fixed value of L-level is supplied to the gates of the transistors M2 and M4, which are the NMOS transistors. This turns the power supply driving circuit 12 off, and the output thereof enters the high impedance state. During the power supply operation, an AC voltage signal is supplied to the respective gates of the transistors M1, M2, M3, and M4 during the power supply operation. This turns the power supply driving circuit 12 on.

The power supply driving circuit 12 and the communication driving circuit 13 may be formed in a single semiconductor IC (integrated circuit) chip, or may be formed in a plurality of semiconductor IC chips separately. It is also possible to use transistors in an IC chip as the transistors for the communication driving circuit 13, and use external transistors components for the power supply driving circuit 12. Alternatively, it is possible to configure the power supply driving circuit 12 so as to be made of a plurality of transistors connected in parallel, some of which are formed in an IC chip and other are external parts.

Next, the operation of the wireless power supply device 10 and the wireless power receiving device 20 in the wireless power transmission system 100 in this embodiment will be explained.

Communication Operation

The wireless power supply device 10 and the wireless power receiving device 20 need to perform a communication operation to exchange information so that it is possible to confirm the correct device and the need for power supply as well as the amount of power to be transmitted and the duration of the power supply.

First, in the wireless power supply device 10, an AC voltage signal of 13.56 MHz is supplied to the gates of the transistors M5, M6, M7, and M8 of the communication driving circuit 13. This activates the communication driving circuit 13, and the communication driving circuit 13 outputs an AC signal (AC amplitude) of 13.56 MHz to the lines L1 and L2.

On the other hand, in the power supply driving circuit 12, the gates of the transistors M1 and M3 are fixed to the H-level, and the transistors M2 and M4 are fixed to the L level. This turns the power supply driving circuit 12 off, and the output thereof enters the shut-off state (high impedance state).

Figure 3:
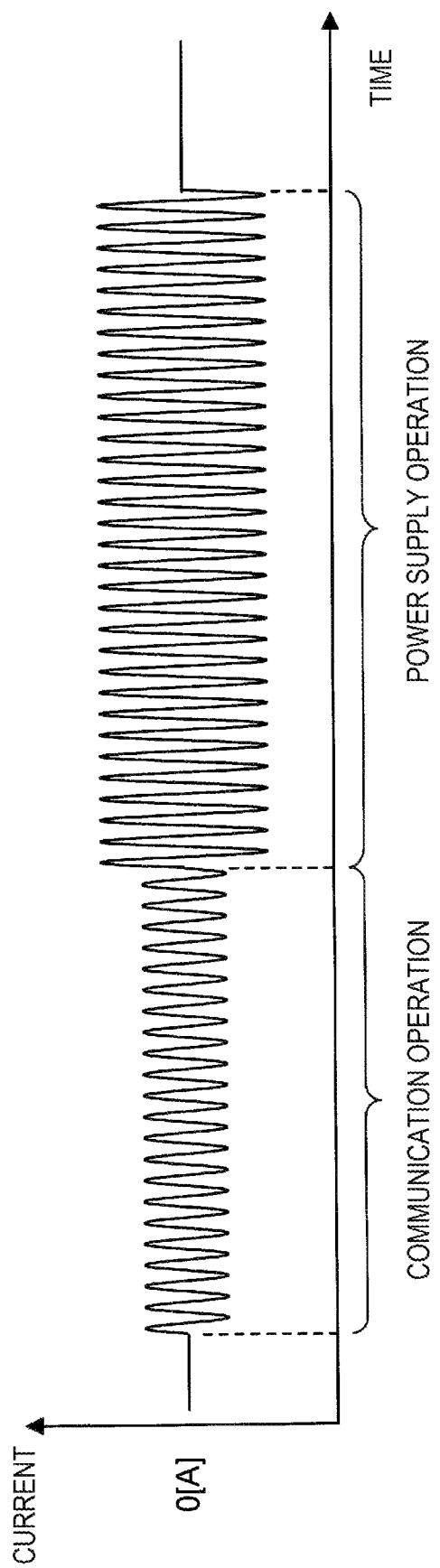
FIG. 3 is a diagram showing the waveform of an AC current that flows through a transmission coil TC of the wireless power supply device 10 of Embodiment 1.

FIG. 3 is a diagram showing the waveform of the AC current that flows through the transmission coil TC. As a result of the operation of the communication driving circuit 13, an AC current of 13.56 MHz, which has a relatively small amplitude, flows through the transmission coil TC. This generates an AC magnetic field of 13.56 MHz in the transmission coil TC.

The receiving coil RC of the wireless power receiving device 20 has magnetic bonding with the transmission coil TC, which causes a high frequency current corresponding to the AC magnetic field of 13.56 MHz to flow through the receiving coil RC. The reception resonant circuit 21 applies an AC voltage having the voltage value corresponding to the AC magnetic field to the lines L3 and L4, and the rectifier circuit 22 conducts the total wave rectification and smoothing on this AC voltage, thereby generating a DC voltage. The wireless power receiving device 20 can conduct communication or information processing using this DC voltage (DC power).

Power Supply Operation

In the wireless power supply device 10, an AC voltage signal of 13.56 MHz is continuously supplied to the gates of the transistors M5, M6, M7, and M8 of the communication driving circuit 13. This allows the communication driving circuit 13 to continue the operation.

On the other hand, an AC voltage signal of 13.56 MHz is also supplied to the gates of the transistors M1, M2, M3, and M4 of the power supply driving circuit 12. This activates the power supply driving circuit 12, and the power supply driving circuit 12 outputs an AC signal (AC amplitude) of 13.56 MHz to the lines L1 and L2.

This makes the communication driving circuit 13 and the power supply driving circuit 12 perform the parallel operation, and the two circuits generate an AC signal of 13.56 MHz of substantially the same phase. Thus, as shown in FIG. 3, an AC current of 13.56 MHZ having a relatively large amplitude flows through the transmission coil TC. This generates an AC magnetic field of 13.56 MHz in the transmission coil TC.

The reception resonant circuit 21 of the wireless power receiving device 20 applies an AC voltage having the voltage value corresponding to the AC magnetic field to the lines L3 and L4, and the rectifier circuit 22 conducts the total wave rectification and smoothing on this AC voltage, thereby generating a DC voltage. Therefore, in the wireless power receiving device 20, a larger DC voltage than the communication operation can be obtained, and power is supplied to the load circuit 23 using this DC voltage.

As described above, in the wireless power transmission system 100 of this embodiment, in the communication operation, the communication driving circuit 13 is operated to generate an AC magnetic field, and in the power supply operation, the communication driving circuit 13 and the power supply driving circuit 12 are operated in a parallel manner to generate an AC magnetic field. Thus, unlike the configuration in which the driving circuit for communication and the driving circuit for power supply are switched between each other, by continuously changing the amplitude of AC current, it is possible to move from the communication operation to the power supply operation without breaking the AC magnetic field.

This makes it possible for the wireless power receiving device 20 to continuously receive power from the AC magnetic field, and also to obtain the operation clock stably from the AC magnetic field.

Because the wireless power supply device 10 continuously sends out the AC magnetic field, it is possible to prevent a sudden change in AC current, which mitigates unwanted radiation or interference with other devices.

Even if there is a difference in phase between the AC signals input into the communication driving circuit 13 and the power supply driving circuit 12 (about +/−20, for example), the transmission coil TC functions as the transmission resonant circuit 11 together with the resonant capacitor C1, and therefore, because of the flywheel effect, it is possible to reduce the impact that could cause an erroneous operation such as breaking or missing frequency amplitude.

By forming a part or all of the power supply driving circuit 12 as an integrated circuit, the heat generated by power loss in the transistors constituting the driving circuit is dispersed, which prevents overheating of the integrated circuit.

Embodiment 2

Figure 4:
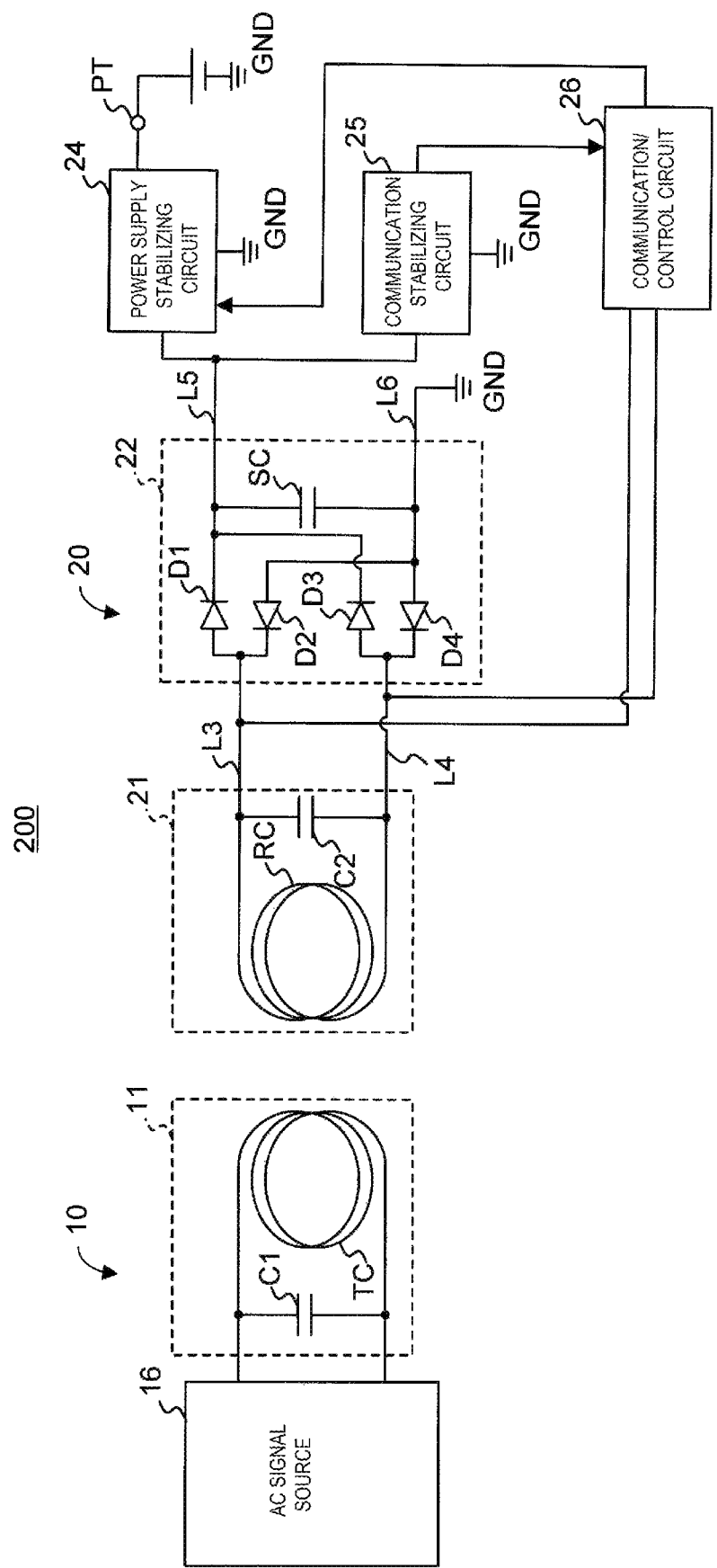
FIG. 4 is a circuit diagram showing the configuration of a wireless power transmission system 200 including a wireless power supply device 10 and a wireless power receiving device 20 of Embodiment 2.

FIG. 4 is a circuit diagram showing the configuration of a wireless power transmission system 200 of Embodiment 2 of the present invention. The wireless power transmission system 200 includes the wireless power supply device 10 and the wireless power receiving device 20. In a manner similar to the wireless power transmission system 100 of Embodiment 1, in the wireless power transmission system 200, power is transmitted from the wireless power supply device 10 to the wireless power receiving device 20 by the magnetic bonding between a transmission coil TC in the wireless power supply device 10 and a receiving coil RC in the wireless power receiving device 20.

The wireless power supply device 10 includes a transmission resonant circuit 11 and an AC signal source 16.

The transmission resonant circuit 11 includes a resonant capacitor C1 and the transmission coil TC that are connected in parallel. The resonance frequency of the transmission resonant circuit 11 is set to 13.56 MHz, for example, and with the supply of an AC signal from the AC signal source 16, generates an AC magnetic field.

The AC signal source 16 generates an AC signal of 13.56 MHz, and supplies the signal to the transmission resonant circuit 11 via the lines L1 and L2, respectively.

The wireless power receiving device 20 includes a reception resonant circuit 21, a rectifier circuit 22, a power supply stabilizing circuit 24, a communication stabilizing circuit 25, and a communication/control circuit 26.

The reception resonant circuit 21 includes a resonant capacitor C2 and the receiving coil RC that are connected in parallel. The resonance frequency of the reception resonant circuit 21 is set to 13.56 MHz, for example, and applies, to lines L3 and L4, respectively, an AC voltage having the voltage value corresponding to the voltage value of the AC magnetic field generated by the transmission coil TC of the wireless power supply device 10 when the receiving coil RC and the transmission coil TC were magnetically bonded by the AC magnetic field.

The rectifier circuit 22 includes a diode bridge connected to four rectifying diodes D1 to D4, and a smoothing capacitor SC. The rectifier circuit 22 conducts total wave rectification and smoothing on the AC voltage applied to the lines L3 and L4, thereby generating a DC voltage, and supplies the DC voltage to the lines L5 and L6.

The power supply stabilizing circuit 24 is connected between the line L5 and the power supply terminal PT. The power supply stabilizing circuit 24 is a stabilizing circuit configured to stabilize the DC voltage applied to the line L5 and supply the voltage to the power supply terminal PT, and is constituted of a series regulator, for example. A power source is connected to the power supply terminal PT as a load. The power supply stabilizing circuit 24 is controlled by the communication/control circuit 26, and is turned off during the communication operation, and turned on during the power supply operation.

The communication stabilizing circuit 25 is a stabilizing circuit configured to stabilize the DC voltage applied to the line L5 and supply the voltage to the communication/control circuit 26, and is constituted of a series regulator, for example. The communication stabilizing circuit 25 stays on throughout the communication operation and the power supply operation.

The communication/control circuit 26 performs communication (exchange information) with the wireless power supply device 10 via the lines L3 and L4, and the reception resonant circuit 21. The communication/control circuit 26 is also configured to turn on and off the power supply stabilizing circuit 24. The communication/control circuit 26 performs those operations using the DC voltage supplied from the communication stabilizing circuit 25 as the operation voltage.

Next, the operation of the wireless power receiving device 20 of this embodiment will be explained.

First, when AC magnetic field is not applied by the wireless power supply device 10, the wireless power receiving device 20 is not activated.

Communication Operation

Next, the wireless power supply device 10 starts applying the AC magnetic field, which causes the receiving coil RC of the wireless power receiving device 20 to magnetically bond with the transmission coil TC of the wireless power supply device 10, and as a result, a high frequency current corresponding to the AC magnetic field of 13.56 MHz flows through the receiving coil RC. The reception resonant circuit 21 applies an AC voltage on the lines L3 and L4. The rectifier circuit 22 conducts total wave rectification and smoothing on the AC voltage applied to the lines L3 and L4, thereby generating a DC voltage. This DC voltage activates the communication stabilizing circuit 25.

The communication stabilizing circuit 25 supplies a voltage obtained by stabilizing the DC voltage generated by the rectifier circuit 22 to the communication/control circuit 26. This activates the communication/control circuit 26. On the other hand, the power supply stabilizing circuit 24 is made to stay off.

The communication/control circuit 26 extracts the clock signal from the AC magnetic field via the lines L3 and L4, and performs communications (information exchange) with the wireless power supply device 10 using the extracted clock signal as the operation clock.

Power Supply Operation

When the wireless power supply device 10 starts applying an AC magnetic field for power supply, the communication/control circuit 26 turns on the power supply stabilizing circuit 24. The power supply stabilizing circuit 24 applies, to the power supply terminal PT, a voltage obtained by the stabilizing the DC voltage applied on the line L5. This supplies power to the power source as a load via the power supply terminal PT.

As described above, in the wireless power receiving device 20 of this embodiment, the communication stabilizing circuit 25 operates in accordance with the application of the AC magnetic field from the wireless power supply device 10, which activates the communication/control circuit 26. Then the communication/control circuit 26 turns on the power supply stabilizing circuit 24. This way, it is possible to activate the wireless power receiving device 20 from the state where there is no power.

Generally, a stabilizing circuit for power supply has a large element size as the circuit handles a large amount of power, and therefore, when the stabilizing circuit is on, it consumes idle current even when the power supply is not performed. However, in this embodiment, the power supply stabilizing circuit 24 is kept off during the communication operation, and as a result, it is possible to suppress the idle current.

Even if the power supply stabilizing circuit 24 is off, the communication stabilizing circuit 25 can operate, and therefore, even if the AC magnetic field applied by the wireless power supply device 10 is small, the communication operation can be performed.

The communication stabilizing circuit 25 continues to operate during the power supply operation, which allows for the stable operation of the communication/control circuit 26 even when the communication operation and the power supply operation are switched over.

Embodiment 3

Figure 5:
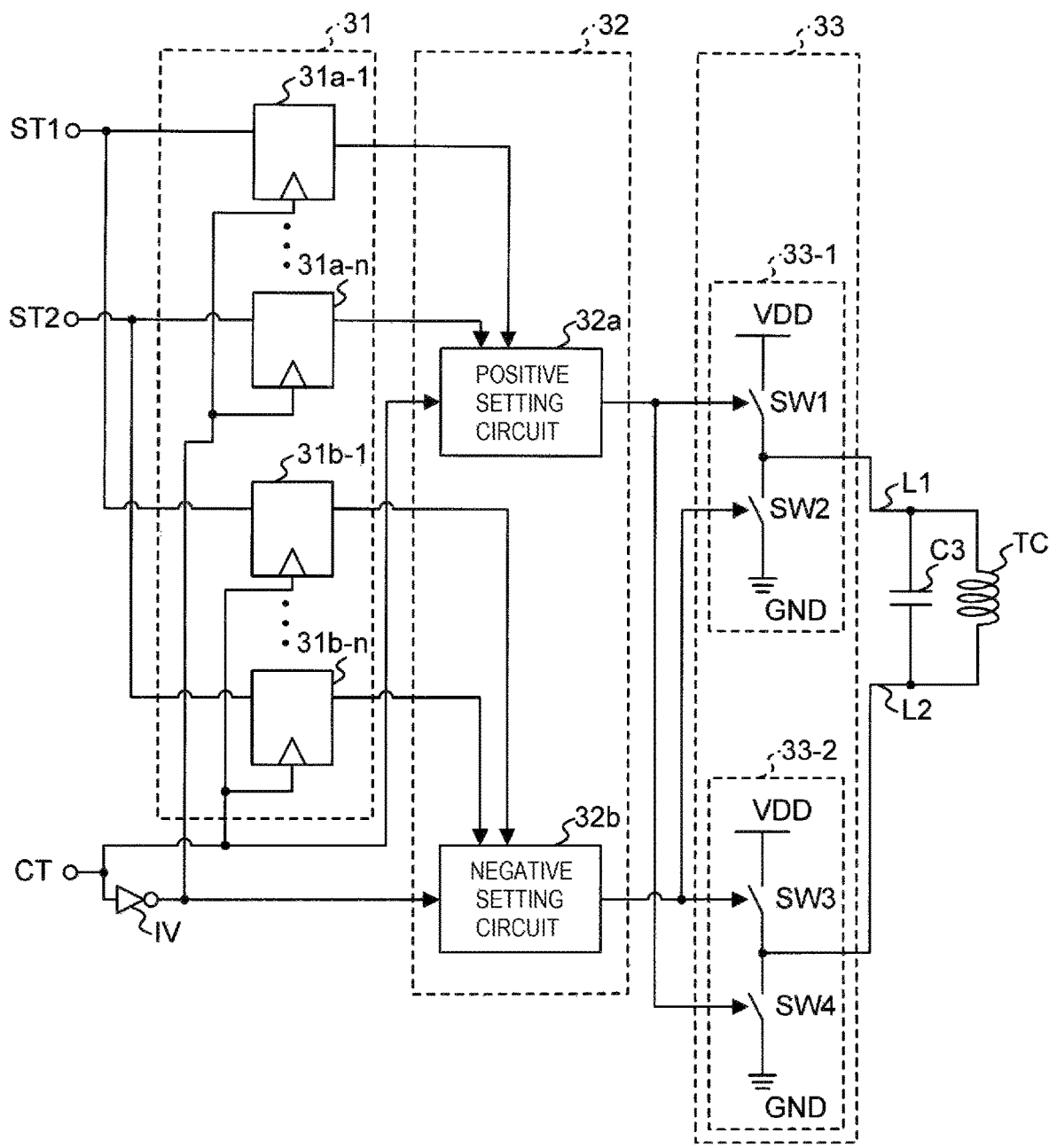
FIG. 5 is a circuit diagram showing the configuration of a wireless power supply device 30 of Embodiment 3.

FIG. 5 is a circuit diagram showing the configuration of the wireless power supply device 30 of Embodiment 3 of the present invention. The wireless power supply device 30 includes a timing circuit 31, a constant setting circuit 32, and a driving switch 33. Setting input terminals ST1 and ST2 receive setting signals for controlling the operation of the driving switch (that is, the operation to send out a current to the transmission coil TC) to set the amplitude of the high frequency current that flows through the transmission coil TC.

The driving switch 33 is a differential switch circuit including a first switch circuit 33-1 connected to the line L1, and a second switch circuit 33-2 connected to the line L2. The first switch circuit 33-1 is constituted of switches SW1 and SW2, and the second switch circuit 33-2 is constituted of switches SW3 and SW4. In the first switch circuit 33-1 and the second switch circuit 33-2, one end is applied with a power voltage VDD, and the other end is applied with a ground voltage GND.

Switches SW1 and SW4 are positive switches that are turned on and off by the supply of the driving switch control signal and that cause an electric current to flow in the positive direction (from top to bottom in the figure), which is the first direction of the transmission coil TC. Switches SW2 and SW3 are negative switches that are turned on and off by the supply of the driving switch control signal and that cause an electric current to flow in the negative direction (from bottom to top in the figure), which is the second direction of the transmission coil TC (opposite direction to the first direction). In the descriptions below, the driving switch control signal supplied to the positive switches will be referred to as a positive pulse, and the driving switch control signal supplied to the negative switches will be referred to as a negative pulse.

In the driving switch 33, those positive switches and negative switched are turned on and off in a complementary manner, which causes a high frequency current to flow through the transmission coil TC.

The constant setting circuit 32 includes a positive setting circuit 32a and a negative setting circuit 32b. The positive setting circuit 32a sets the constant (the pulse width of the positive pulse, for example) for specifying the operation of the positive switches SW1 and SW4 of the driving switch 33 based on the setting signal supplied after the timing adjustment by positive flip-flops 31a-1 to 31a-n of the timing circuit 31. With this constant setting, the amount of the current that flows in the positive direction of the transmission coil TC is specified. The positive setting circuit 32a uses, as the operation clock, an AC clock signal of 13.56 MHz input from the clock input terminal CT (will be simply referred to as an AC clock signal below).

The negative setting circuit 32b sets the constant (the pulse width of the negative pulse, for example) for specifying the operation of the negative switches SW2 and SW3 of the driving switch 33 based on the setting signal supplied after the timing adjustment by negative flip-flops 31b-1 to 31b-n of the timing circuit 31. With this constant setting, the amount of the current that flows in the negative direction of the transmission coil TC is specified. The negative setting circuit 32b uses, as the operation clock, an inverted clock signal obtained by inverting the AC clock signal by an inverter IV (will be simply referred to as an inverted clock signal below).

The timing circuit 31 is a circuit that performs the timing adjustment (time adjustment) of the constant setting process by the constant setting circuit 32 by supplying the setting signal, which are input into the setting input terminals ST1 and ST2, into the constant setting circuit 32 without delay. The timing circuit 31 includes the positive flip-flops 31a-1 to 31a-n (n is a natural number) and the negative flip-flops 31b-1 to 31b-n. The positive flip-flops 31a-1 to 3a-n use the inverted clock signal as the operation clock. The negative flip-flops 31b-1 to 31b-n use the AC clock signal as the operation clock.

In the wireless power supply device 30 of this embodiment, the timing of supplying the setting signal to the positive setting circuit 32a and the negative setting circuit 32b is adjusted by the timing circuit 31, thereby making it possible to adjust the timing of constant setting (or in other words, constant change) in the positive setting circuit 32a and the negative setting circuit 32b.

Thus, if the pulse width of each positive pulse and negative pulse is to be changed as a constant, for example, the constant for the positive pulse can be changed when the positive pulse is at a LL level (or in other words, when the positive switches are off), and the constant for the negative pulse can be changed when the negative pulse is at a LL level (or in other words, when the negative switches are off).

Figure 6:
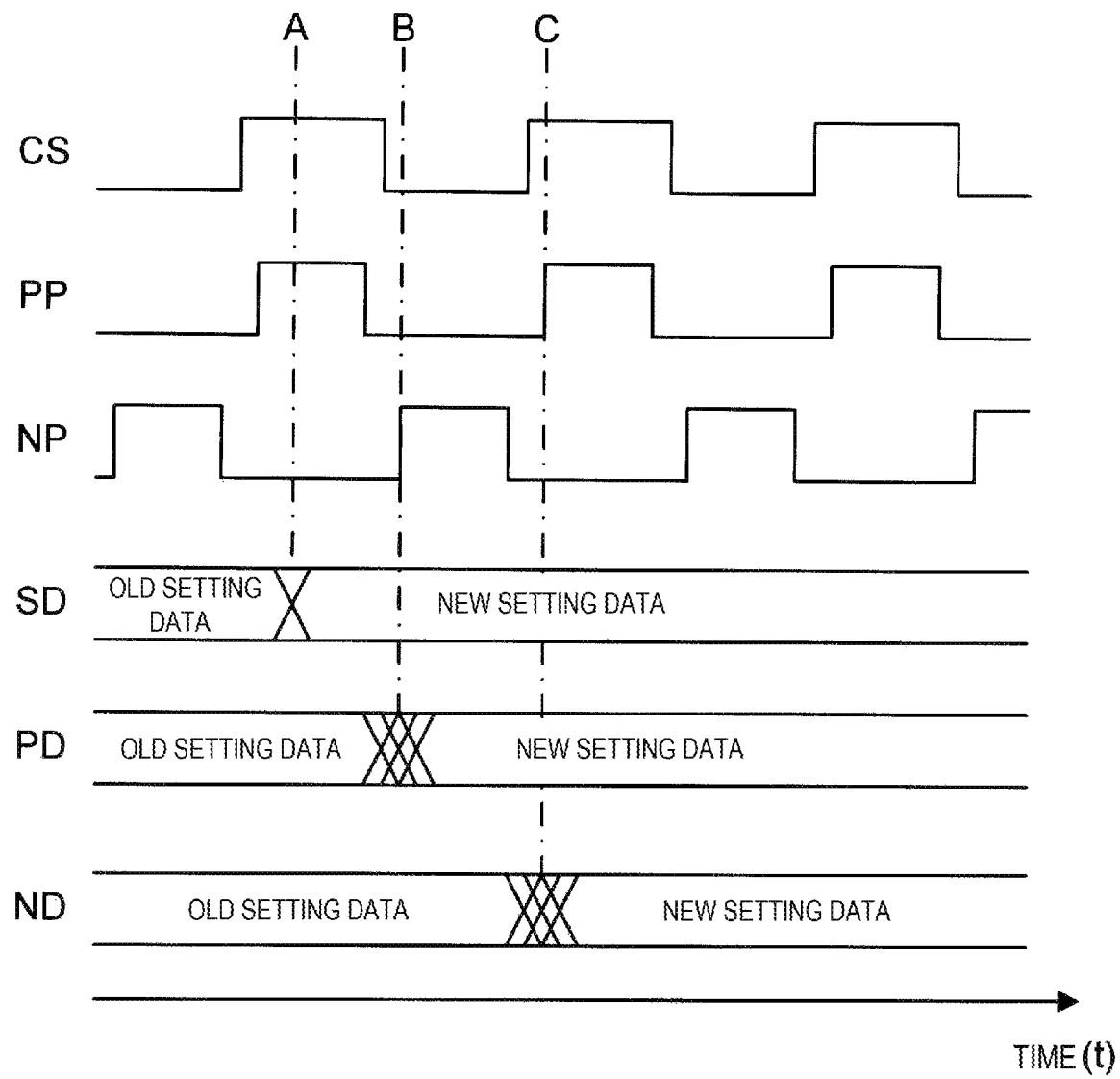
FIG. 6 is a time chart showing an example of the timing of constant change by the wireless power supply device 30 of Embodiment 3.

FIG. 6 is a time chart showing an example of the timing to change a constant. This figure shows the temporal change of the AC clock signal of 13.56 MHz (CS in the figure), the positive pulse (PP in the figure), the negative pulse (NP in the figure), the setting data of the setting signal input into the setting input terminal CT (SD in the figure), the setting data of the positive pulse (PD in the figure), and the setting data of the negative pulse (ND in the figure).

For example, when the setting signal to change the constant of old setting data to a constant of new setting data is input into the setting input terminals ST1 and ST2 at the timing A, the timing circuit 31 delays this signal, and supplies the delayed signal to the positive setting circuit 32a and the negative setting circuit 32b. This way, the setting data (pulse width, for example) of the positive pulse and the negative pulse can be changed at the most appropriate timing. For example, by adjusting the timing to change the setting data of the positive pulse to the timing B shown in the figure, the constant of the positive pulse can be changed during a period in which the positive pulse stays at the L level. Also, by adjusting the timing to change the setting data of the negative pulse to the timing C shown in the figure, the constant of the negative pulse can be changed during a period in which the negative pulse stays at the L level.

Figure 7:
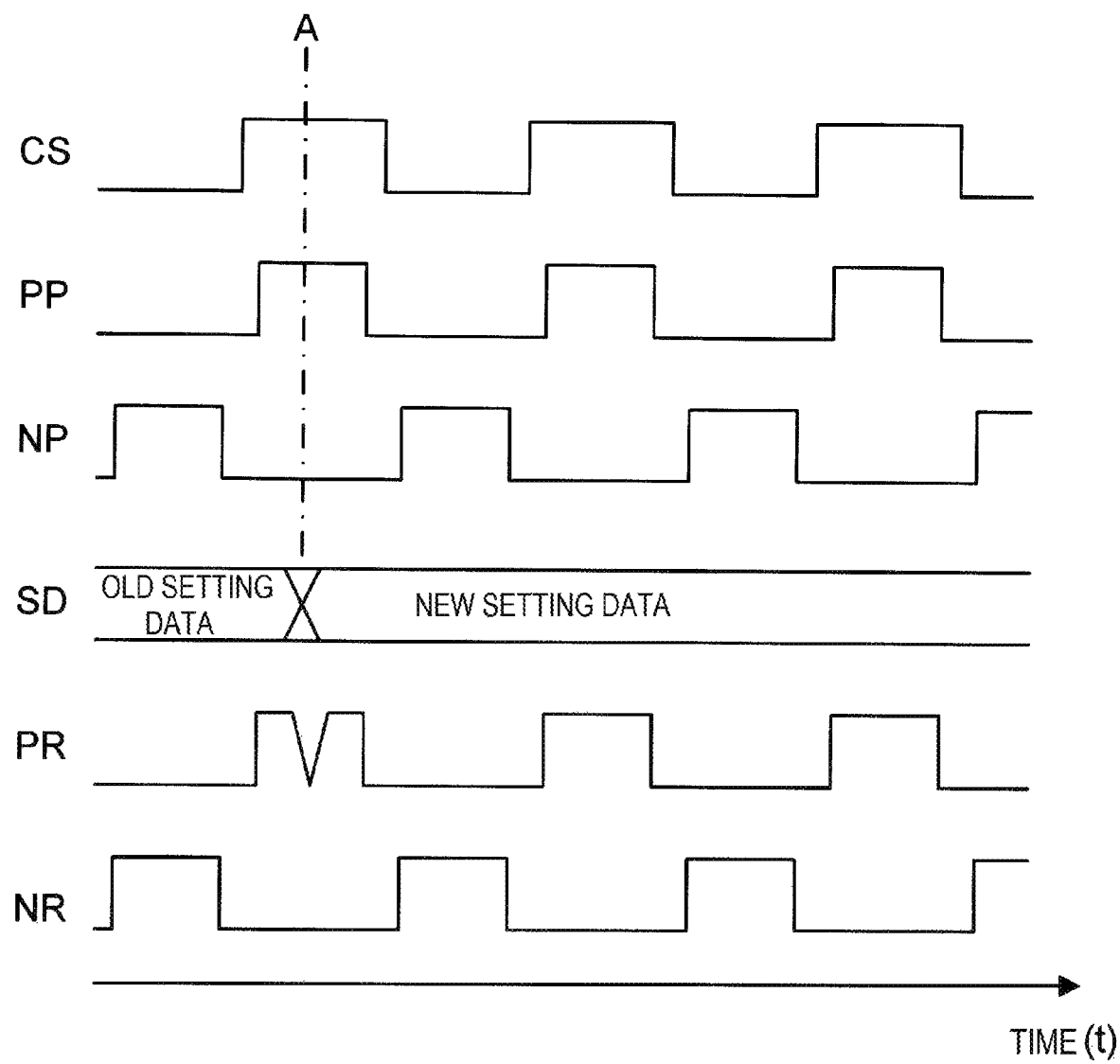
FIG. 7 is a time chart showing the timing of constant change as a comparison example where a timing circuit 31 is not provided.

FIG. 7 is a time chart showing a comparison example in which the timing circuit 31 of the prevent invention is not provided. When the setting signal to change the constant of old setting data to a constant of new setting data is input into the setting input terminals ST1 and ST2 at the timing A, the setting data of the positive setting circuit 32a is changed at the same timing. Thus, depending on when the timing may be, the setting data of the positive pulse can be changed during a period in which the positive pulse stays at the H level, and distortion is caused in the waveform of the output result (PR in the figure) of the positive pulse. As a result, the high frequency current that flows through the transmission coil TC would have distortion.

With the wireless power supply device 30 of this embodiment, it is possible to change the constant of the positive pulse and the negative pulse without causing the distortion in the waveform. This allows a stable magnetic field to be generated in the process of changing the amplitude of the high frequency current that flows through the transmission coil TC, and as a result, power and clock can be stably supplied to the power receiving side (wireless power receiving device). Also, because the distortion in the waveform of the positive pulse, negative pulse, and high-frequency current causes interference with other devices due to unwanted radiation or erroneous operation due to a change in power source, by using the wireless power supply device 30 of this embodiment, it is possible to suppress those problems.

Embodiment 4

Figure 8:
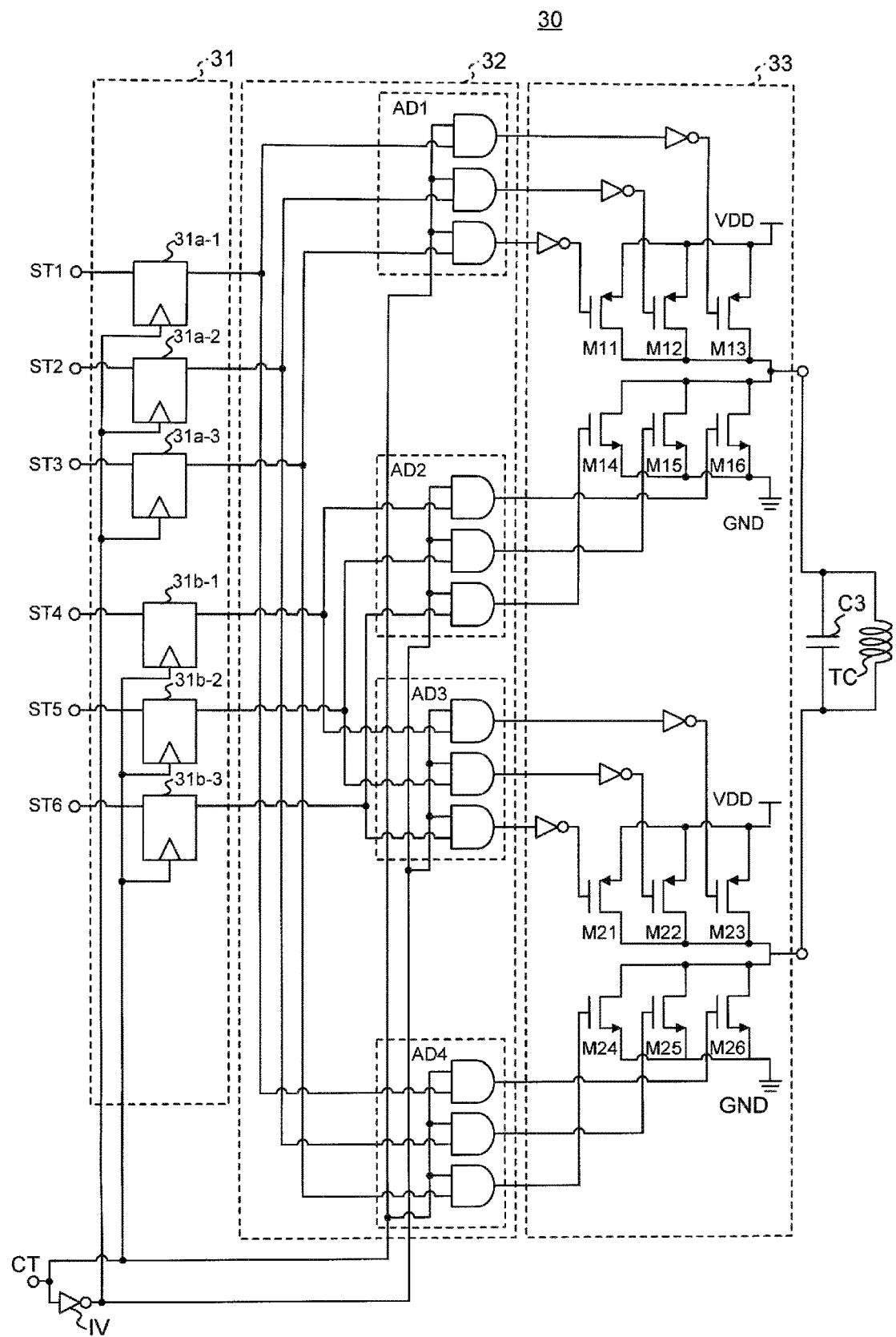
FIG. 8 is a circuit diagram showing the configuration of a wireless power supply device 30 of Embodiment 4.

FIG. 8 is a diagram showing the configuration of the wireless power supply device of Embodiment 4 of the present invention. The wireless power supply device of this embodiment differs from the wireless power supply device 30 of Embodiment 3 shown in FIG. 5 in that the driving switch 33 is constituted of a plurality of transistors connected in parallel, and the constant setting circuit 32 is configured such that the constant is set to the number of transistors that are turned on when the current is transmitted among the plurality of transistors (parallel number). The timing circuit 31 includes three positive flip-flops and three negative flip-flops (n=3).

The constant setting circuit 32 includes an AND circuit AD1 that outputs, as a signal, the logical product of the output signal from the positive flip-flops 31a-1 to 31a-3 (or in other words, the signal obtained by adjusting the timing of the setting signal, which are input into the setting input terminals ST1 to ST3) and the AC clock signal, an AND circuit AD2 that outputs, as a signal, the logical product of the output signal from the negative flip-flops 31b-1 to 31b-3 (or in other words, the signal obtained by adjusting the timing of the setting signal, which are input into the setting input terminals ST4 to ST6) and the inverted clock signal, an AND circuit AD3 that outputs, as a signal, the logical product of the output signal from the negative flip-flops 31b-1 to 31b-3 and the inverted clock signal, and an AND circuit AD4 that outputs, as a signal, the logical product of the output signal from the positive flip-flops 31*b*-1 to 31*b*-3 and the AC clock signal.

The driving switch 33 includes a first switch circuit constituted of transistors M11, M12 and M13, which are PMOS transistors and connected in parallel, and transistors M14, M15, and M16, which are NMOS transistors and connected in parallel, and a second switch circuit constituted of transistors M21, M22, and M23, which are PMOS transistors and connected in parallel, and transistors M24, M25, and M26, which are NMOS transistors and connected in parallel.

The transistors M11 to M13 and M24 to M26 are positive switch transistors that cause a current to flow in the positive direction of the transmission coil TC. On the other hand, the transistors M14 to M16 and M21 to M23 are negative switch transistors that cause a current to flow in the negative direction of the transmission coil TC.

The respective gates of the transistors M11, M12, and M13 receive a signal obtained by inverting the respective output signals of the AND circuit AD1 (or in other words, a signal made of the logical product of the output signals from the flip-flops 31*a*-1 to 31*a*-3 and the AC clock signal). The respective gates of the transistors M14, M15, and M16 receive a signal obtained by inverting the respective output signals of the AND circuit AD2 (or in other words, a signal made of the logical product of the output signals from the flip-flops 31*b*-1 to 31*b*-3 and the inverted clock signal).

The respective gates of the transistors M21, M22, and M23 receive a signal obtained by inverting the respective output signals of the AND circuit AD3 (or in other words, a signal made of the logical product of the output signals from the flip-flops 31*b*-1 to 31*b*-3 and the inverted clock signal). The respective gates of the transistors M24, M25, and M26 receive a signal obtained by inverting the respective output signals of the AND circuit AD4 (or in other words, a signal made of the logical product of the output signals from the flip-flops 31*a*-1 to 31*a*-3 and the AC clock signal).

Among the transistors M11 to M13 and M24 to M26, transistors that are to be on and send out a current are selected based on the setting signal input into the setting input terminals ST1 to ST3. That is, the number of transistors (parallel number) that are turned on to send out a current varies depending on the setting signal. This way, the amount of the current that flows in the positive direction of the transmission coil TC is changed.

Similarly, among the transistors M14 to M16 and M21 to M23, transistors that are to be on and send out a current are selected based on the setting signal input into the setting input terminals ST4 to ST6. That is, the number of transistors (parallel number) that are turned on to send out a current varies depending on the setting signal. This way, the amount of the current that flows in the negative direction of the transmission coil TC is changed.

Figure 9:
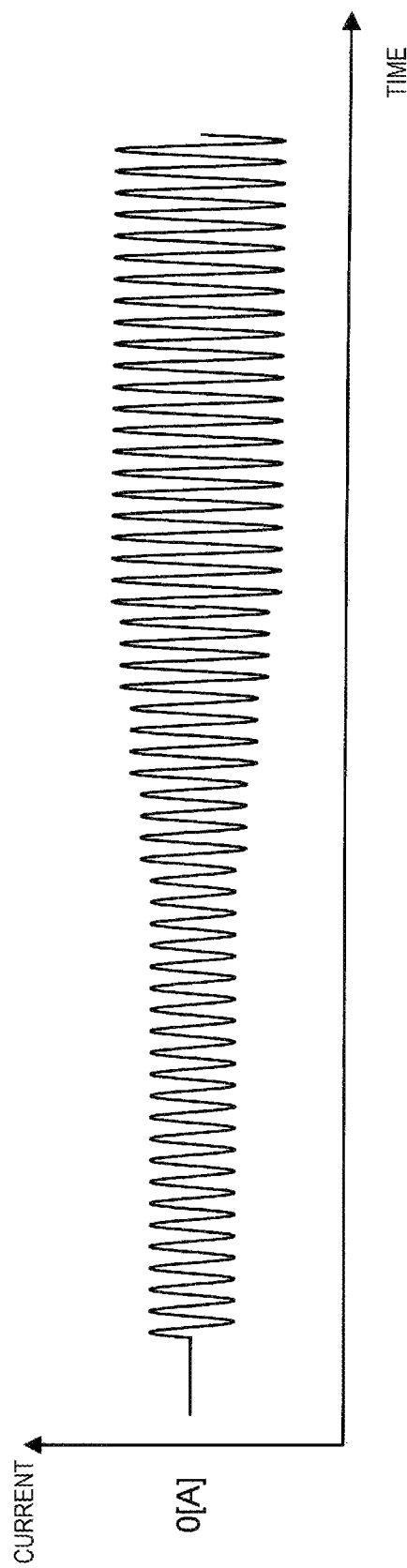
FIG. 9 is a waveform diagram showing an example of the waveform when the amplitude of a high-frequency current flowing through the transmission coil TC is made to change gradually.

Therefore, by inputting a setting signal so that the number of transistors that are turned on to send out a current gradually changes, it is possible to gradually change the amplitude of the high-frequency current flowing through the transmission coil TC as shown in FIG. 9.

Figure 10:
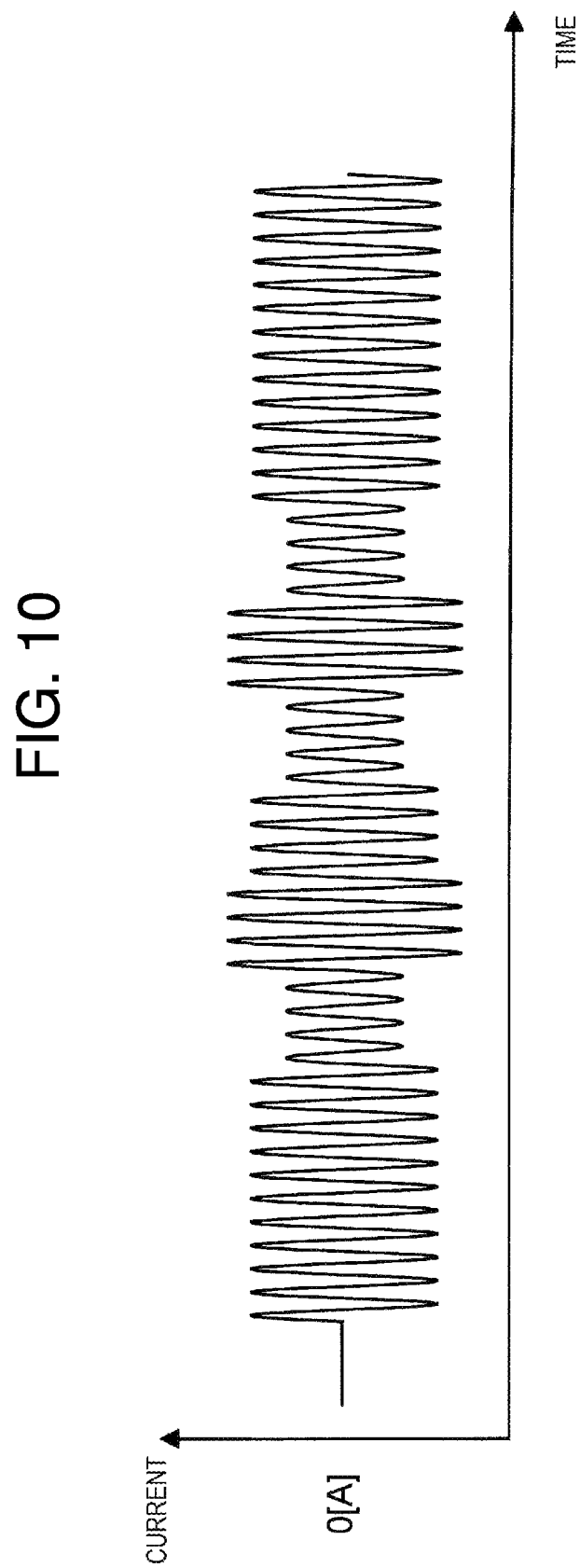
FIG. 10 is a waveform diagram showing an example of the waveform when the amplitude of a high-frequency current flowing through the transmission coil TC is made to change in accordance with a pseudo-random pattern.

It is also possible to change the amplitude of the high-frequency current flowing through the transmission coil TC so as to follow a pseudo-random pattern as shown in FIG. 10. A pseudo-random pattern can be generated by a random pattern generating circuit using a shift register, a look-up table, or a delta sigma circuit, and by inputting this pattern into the setting input terminal ST1 to ST6 to change the number of transistors to be on to send out a current, the amplitude of the high-frequency current can be changed in accordance with the pseudo-random pattern.

Alternatively, it is possible to change the number of transistors or the pulse width of the positive pulse and the negative pulse regularly. The change pattern in the time axis direction may have an even interval or a random interval.

Figure 11:
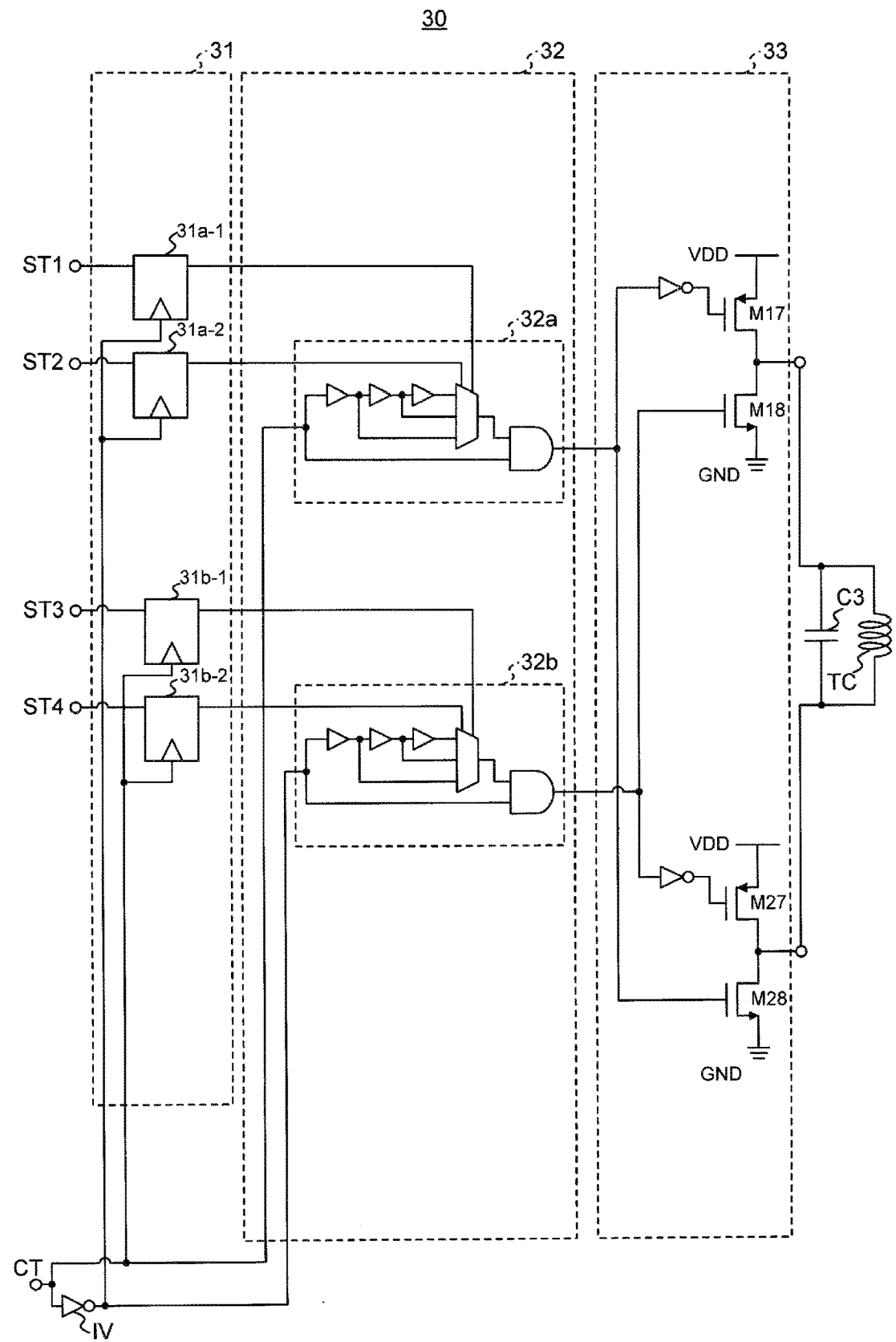
FIG. 11 is a circuit diagram showing the configuration of a modification example of the wireless power supply device 30 of Embodiment 4.

FIG. 11 is a diagram showing the configuration of a modification example of the wireless power supply device 30 of this embodiment. The wireless power supply device of FIG. 11 differs from the wireless power supply device 30 shown in FIG. 5 in that the constant setting circuit 32 sets (change) the constant to the width of the positive pulse and the negative pulse supplied to the gates of the transistors constituting the driving switch 33 (will be referred to as a gate pulse below). The timing circuit 31 includes two positive flip-flops and two negative flip-flops (n=2).

The constant setting circuit 32 is constituted of a positive setting circuit 32*a* and a negative setting circuit 32*b*. The positive setting circuit 32*a* outputs a signal that is the logical product of the AC clock signal and a delayed clock signal, which is obtained by delaying the AC clock signal based on the output signals from the positive flip-flops 31*a*-1 and 31*a*-2 (or in other words, signals obtained by adjusting the timing of the setting signals input into the setting input terminals ST1 and ST2). The negative setting circuit 32*b* outputs a signal that is the logical product of the inverted clock signal and a delayed inverted clock signal, which is obtained by delaying the inverted clock signal based on the output signals from the negative flip-flops 31*b*-1 and 31*b*-2 (or in other words, signals obtained by adjusting the timing of the setting signals input into the setting input terminals ST3 and ST4).

The driving switch 33 includes a first switch circuit constituted of a transistor M17, which is a PMOS transistor, and a transistor M18, which is an NMOS transistor, and a second switch circuit constituted of a transistor M27, which is a PMOS transistor, and a transistor M28 which is an NMOS transistor.

The transistors M17 and M28 are positive switch transistors that cause a current to flow in the positive direction of the transmission coil TC. On the other hand, the transistors M18 and M27 are negative switch transistors that cause a current to flow in the negative direction of the transmission coil TC.

The gate of the transistor M17 receives a positive pulse that is the signal obtained by inverting the output signal from the positive setting circuit 32*a*, and the gate of the transistor M18 receives a negative pulse that is the signal obtained by inverting the output signal from the negative setting circuit 32*b*. The gate of the transistor M27 receives a negative pulse that is the signal obtained by inverting the output signal from the negative setting circuit 32*b*, and the gate of the transistor M28 receives a positive pulse that is the signal obtained by inverting the output signal from the positive setting circuit 32*a*.

The pulse width of the output signals of the positive setting circuit 32*a* and the negative setting circuit 32*b* varies depending on the setting signals input into the setting input terminals ST1 to ST4. That is, the pulse width of the gate pulse applied to each gate of the transistors M17, M18, M27, and M28 varies depending on the setting signal. This way, the amount of the current that flows in the positive and negative directions of the transmission coil TC can be adjusted.

Therefore, by inputting a setting signal so that those pulse widths gradually change, it is possible to gradually change the amplitude of the high-frequency current flowing through the transmission coil TC as shown in FIG. 9. Alternatively, by inputting a setting signal so that those pulse widths change in accordance with a pseudo-random pattern, it is possible to change the amplitude of the high-frequency current flowing through the transmission coil TC in accordance with a pseudo-random pattern as shown in FIG. 10.

As described above, with the wireless power supply device 30 of this embodiment, it is possible to smoothly change the amplitude of the high-frequency signal based on the setting signal input into the setting input terminal. Because the high-frequency signal smoothly changes at the start and end of communication, at the start and end of power supply, and upon power level change, ASK modulation during communication, and load modulation, it is possible to prevent noise interference in the power supply system and interference with other devices due to unwanted radiation. Also, it is possible to stably supply power and clock to the power receiving side (wireless power receiving device).

In the wireless power supply device 30 of this embodiment, by changing the number of transistor or the pulse width of the gate pulse supplied to the gate of each transistor regularly or randomly, the amplitude of power transmission can be finely adjusted. Also, by using a high-accuracy clock signal as the AC clock signal, it is possible to control the amplitude of power transmission at a high degree of accuracy in the time axis direction.

With the wireless power supply device 30 of this embodiment, by adjusting the power at the transmission side, unnecessary power loss can be suppressed. Furthermore, by adjusting the pulse width of the gate pulse supplied to the gate of each transistor so that the on period of each transistor is made shorter, the penetration current generated when multiple switches between the power supply and the ground are turned on at the same time can be suppressed, which allows for the reduction in unnecessary power consumption.

Embodiment 5

Figure 12:
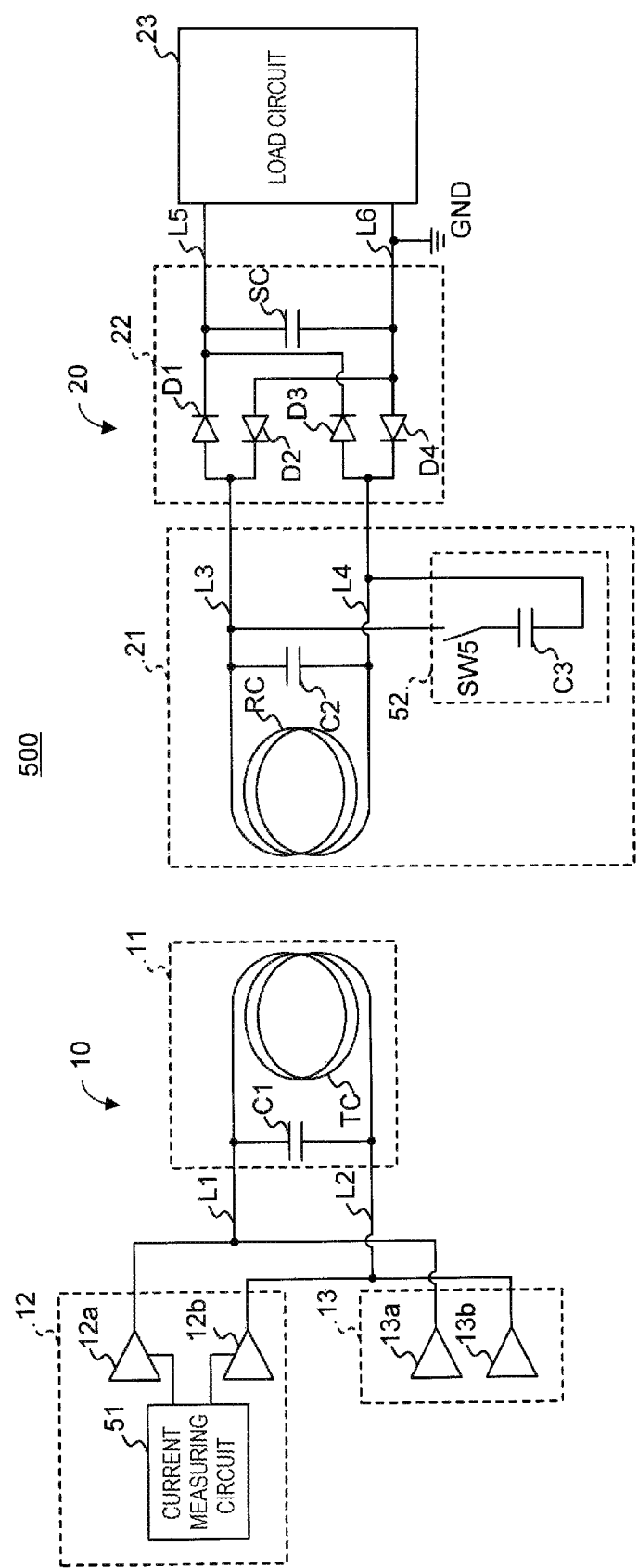
FIG. 12 is a circuit diagram showing the configuration of a wireless power transmission system 500 of Embodiment 5.

FIG. 12 is a circuit diagram showing the configuration of a wireless power transmission system 500 of Embodiment 5 of the present invention. In a manner similar to Embodiment 1, the wireless power transmission system 500 includes the wireless power supply device 10 and the wireless power receiving device 20, and power is transmitted from the wireless power supply device 10 to the wireless power receiving device 20 by the magnetic bonding between a transmission coil TC in the wireless power supply device 10 and a power receiving coil RC in the wireless power receiving device 20.

In the wireless power supply device 10 of the present invention, the power supply driving circuit 12 further includes a current measuring circuit 51. The current measuring circuit 51 is configured to measure the current value of the driving current in the first driving part 12a and the second driving part 12b.

The wireless power supply device 10 of this embodiment has the function of determining whether a foreign object such as a piece of a conductor is near the transmission coil TC or not. If a foreign object is near the transmission coil TC, a high-frequency current flows through the foreign object due to the magnetic induction, which changes the current value of the driving current. Thus, the wireless power supply device 10 can determine whether a foreign object such as a piece of a conductor is near the transmission coil TC or not based on the current value of the driving current measured by the current measuring circuit 51.

In the wireless power receiving device 20 of this embodiment, the reception resonant circuit 21 includes a resonance change circuit 52. The resonance change circuit 52 includes a switch SW5 and a capacitor C3. When the switch SW5 is turned on, the capacitor C3 is connected in parallel to the receiving coil RC. This changes the capacity of the resonant capacitor in the reception resonant circuit 21. The wireless power receiving device 20 turns on the switch SW5 to change the capacity of the resonant capacitor in the process of detecting a foreign object by the wireless power supply device 10.

Figure 13:
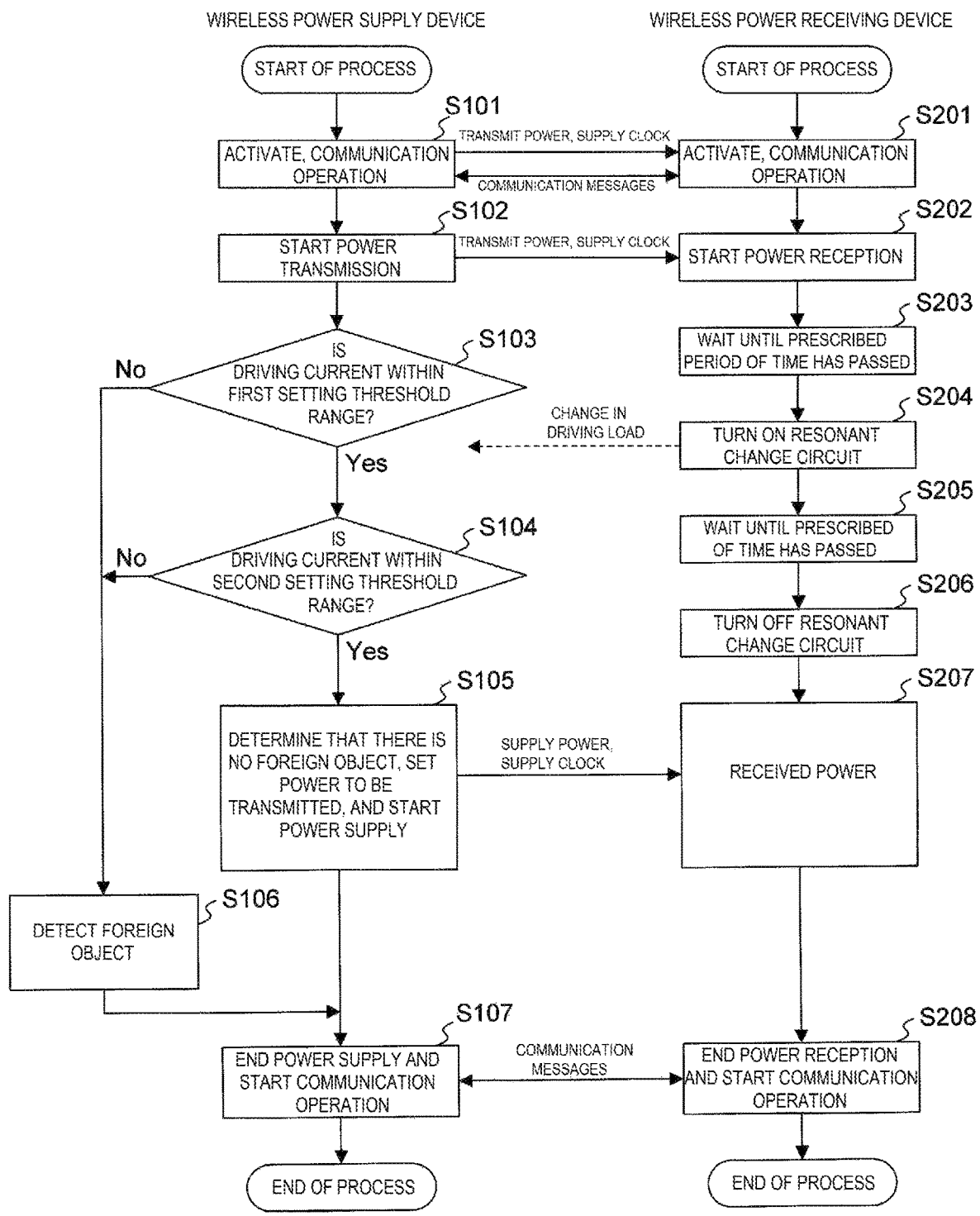
FIG. 13 is a flowchart showing the operation of the wireless power supply device 10 and the wireless power receiving device 20 of Embodiment 5.

Next, the operation of the wireless power supply device 10 and the wireless power receiving device 20 of this embodiment will be described with reference to the flow chart of FIG. 13.

First, the wireless power supply device 10 and the wireless power receiving device 20 are activated. The communication driving circuit 13 of the wireless power supply device 10 causes the AC magnetic field to be generated in the transmission coil TC, and the wireless power supply device 10 transmits power and supplies clock to the wireless power receiving device 20 for communication. The wireless power supply device 10 and the wireless power receiving device 20 start the communication operation (Steps S101 and 201).

Next, the power supply driving circuit 12 of the wireless power supply device 10 is activated and starts transmitting power for power supply (Step S102). The wireless power receiving device 20 starts receiving power (Step S202). In this state, the wireless power receiving device 20 waits until a prescribed period of time has passed (Step S203).

The current measuring circuit 51 of the wireless power supply device 10 measures the current value of the driving current, and determines whether or not the measured current value is within a first setting threshold range that was set in advance (50 mA or greater and 60 mA or smaller, for example) (Step S103).

When the measured current value is not within the first setting threshold range (Step S103: No), the wireless power supply device 10 determines that there is a foreign object (Step S106), and terminates the power transmission for power supply. Then the wireless power supply device 10 reduces the transmission power to the level of the communication operation, and returns to the communication operation (Step S107). With this operation, the wireless power receiving device 20 ends the power receiving operation, and returns to the communication operation.

On the other hand, if the measured value of the driving current is within the first setting threshold range (Step S103: Yes), the wireless power receiving device 20 turns on the switch SW5 of the resonance change circuit 52 to change the capacity of the resonant capacitor in the reception resonant circuit 21 (Step S204). This changes the driving load. In this state, the wireless power receiving device 20 waits until a prescribed period of time has passed (Step S205).

The current measuring circuit 51 of the wireless power supply device 10 measures the current value of the driving current again, and determines whether or not the measured current value is within the second setting threshold range that was set in advance (40 mA or greater and 50 mA or smaller, for example) (Step S104).

When the measured current value is not within the second setting threshold range (Step S104: No), the wireless power supply device 10 determines that there is a foreign object (Step S106), and terminates the power transmission for power supply. Then the wireless power supply device 10 reduces the transmission power to the level of the communication operation, and returns to the communication operation (Step S107). The wireless power receiving device 20 also ends the power receiving operation, turns off the switch SW5 of the resonance change circuit 52, and returns to the communication operation.

On the other hand, if the measured value of the driving current is within the second setting threshold range (Step S104: Yes), the wireless power receiving device 20 turns off the switch SW5 of the resonance change circuit 52 to restore the capacity of the resonant capacitor in the reception resonant circuit 21 (Step S206). The wireless power supply device 10 determines that there is no foreign object, and sets the transmission power to start the power supply (Step S105). The wireless power receiving device 20 starts receiving power (Step S207). After performing the power supply, the wireless power supply device 10 ends the power transmission for power supply, and returns to the communication operation (Step S107). The wireless power receiving device 20 also ends the power receiving operation, and returns to the communication operation (Step S208).

With the operation described above, the wireless power supply device 10 and the wireless power receiving device 20 of this embodiment determine whether there is a foreign object near the transmission coil TC. The detection of a foreign object based on the measured driving current is conducted in both cases where the switch SW5 of the resonance change circuit 52 is turned off and on. This makes it possible to prevent an erroneous operation caused by received power being insufficient when the switch SW5 of the resonance change circuit is turned on for detecting a foreign object in the wireless power receiving device 20, which allows the device to continue the operation stably.

Embodiment 6

Figure 14:
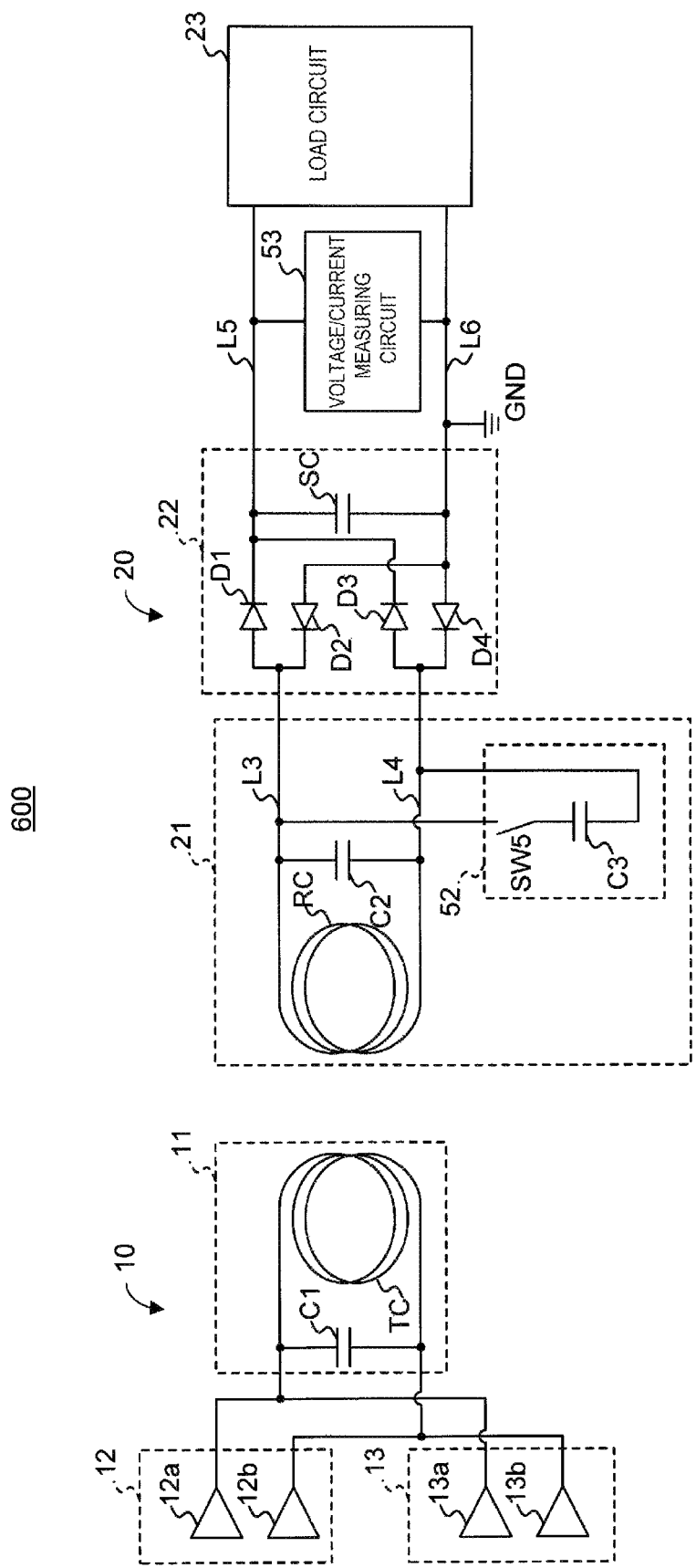
FIG. 14 is a circuit diagram showing the configuration of a wireless power transmission system 600 of Embodiment 6.

FIG. 14 is a circuit diagram showing the configuration of a wireless power transmission system 600 of Embodiment 6 of the present invention. In a manner similar to Embodiment 1, the wireless power transmission system 600 includes the wireless power supply device 10 and the wireless power receiving device 20, and power is transferred from the wireless power supply device 10 to the wireless power receiving device 20 by magnetic bonding between a transmission coil TC in the wireless power supply device 10 and a receiving coil RC in the wireless power receiving device 20.

The wireless power receiving device 20 of this embodiment includes a voltage/current measuring circuit 53 configured to measure the voltage and current in the lines L5 and L6. The wireless power receiving circuit 20 has the function of determining whether an excessive magnetic field is generated or not based on the measured voltage value and current value.

The wireless power receiving device 20 has a resonance change circuit 52 including a switch SW5 and a capacitor C3 in a manner similar to Embodiment 5. When the switch SW5 is turned on, the capacitor C3 is connected in parallel to the receiving coil RC, and the capacity of the resonant capacitor in the reception resonant circuit 21 changes. In the process of detecting an excessive magnetic field, the wireless power receiving device 20 turns on the switch SW5 and changes the capacity of the resonant capacitor so that the matching of the magnetic bonding of the transmission coil TC and receiving coil RC gets off, which reduces the power to be received.

Figure 15:
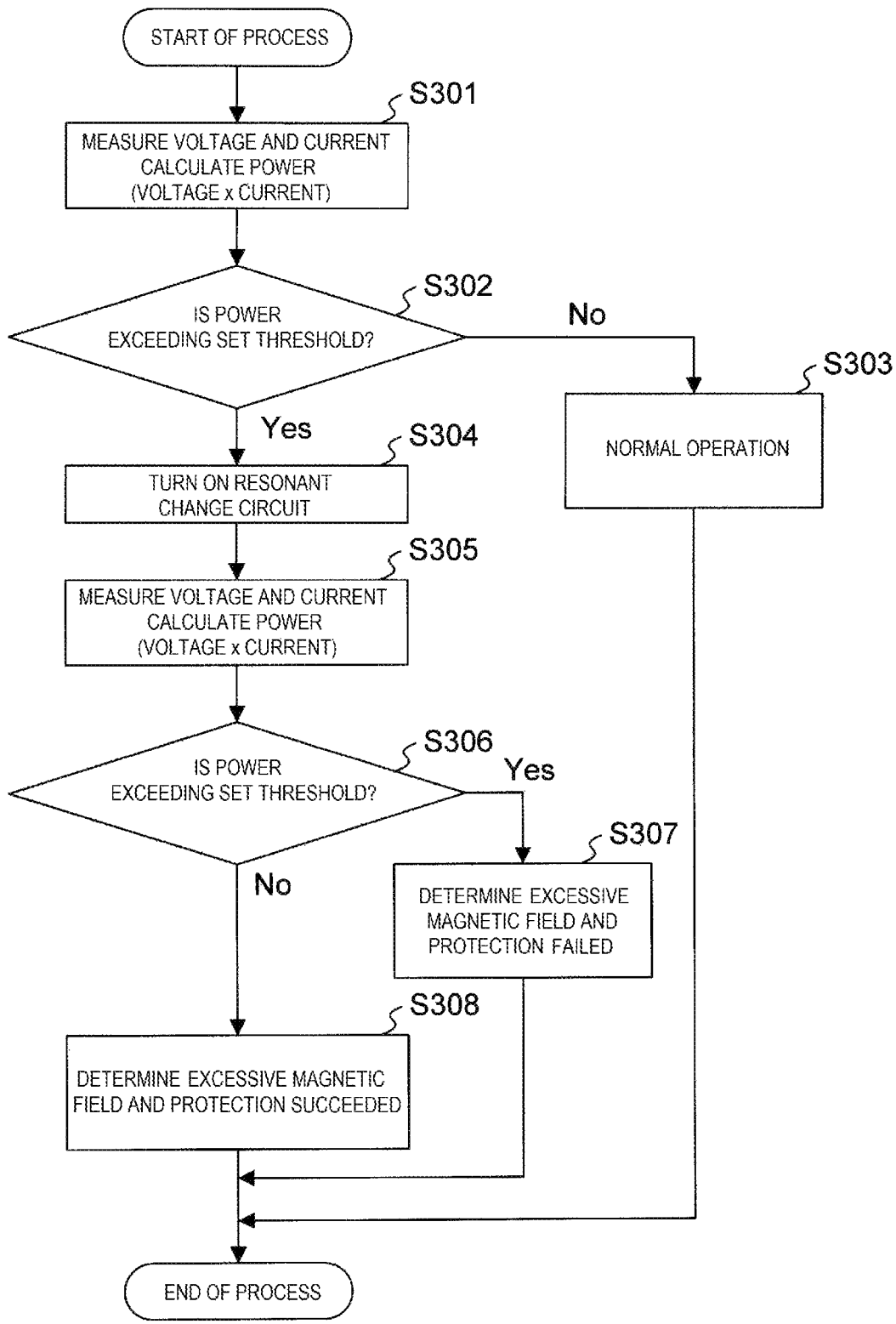
FIG. 15 is a flowchart showing the operation of the excess magnetic field detection process conducted by the wireless power receiving device 20 of Embodiment 6.

Next, the operation of the excessive magnetic field detection performed by the wireless power receiving device 20 of this embodiment will be described with reference to the flow chart of FIG. 15.

First, the setting threshold for received power is set in advance (1 watt, for example) based on the allowable power loss of the wireless power receiving device 20.

The wireless power receiving device 20 receives power transmitted by the wireless power supply device 10. The voltage/current measuring circuit 53 measures the voltage value and current value at the lines L5 and L6, performs calculation (voltage×current) based on the measured value, and derives the received power (Step S301). Then the wireless power receiving device 20 determines whether the calculated received power exceeds the setting threshold set in advance or not (Step S302).

If the received power does not exceed the setting threshold (Step S302: No), the wireless power receiving device 20 determines that there is no abnormality, ends the process, and returns to the power receiving operation (Step S303).

On the other hand, if the received power exceeds the setting threshold (Step S302: Yes), the wireless power receiving device 20 turns on the switch SW5 of the resonance change circuit 52 and changes the capacity of the resonant capacitor in order to move the matching of the magnetic field bonding and reduce the power to be received (Step S304). This changes the driving load. During this process, the wireless power supply device 10 is continuously supplying power and clock, and therefore, the communication circuit and control circuit (not shown in the figure) of the wireless power receiving circuit 20 are continuously performing respective operations thereof.

The voltage/current measuring circuit 53 measures the voltage value and current value again, performs calculation (voltage×current) based on the measured value, and derives the received power (Step S305). Then the wireless power receiving device 20 determines whether the calculated received power exceeds the setting threshold set in advance or not (Step S306).

If the received power does not exceed the setting threshold (Step S306: No), that means that excessive magnetic field is occurring and the protection against the excessive magnetic field was successfully done by changing the capacity of the resonant capacitor, and therefore, the wireless power receiving device 20 ends the process and returns to the power receiving operation (Step S308).

On the other hand, if the received power exceeds the setting threshold (Step S306: Yes), that means that excessive magnetic field is occurring and the protection against the excessive magnetic field was not successfully done (Step S307). Thus, the wireless power receiving device 20 performs protection through other methods such as fusing.

As described above, when the received power exceeds the threshold, the wireless power receiving device 20 of this embodiment determines that excessive magnetic field is occurring, and changes the capacity of the resonant capacitor. If the received power still exceeds the threshold after the capacity of the resonant capacitor has changed, the wireless power receiving device 20 performs another protection method.

If a protection method such as clamp or short-circuit is performed immediately after excessive magnetic field is applied, power and clock for the operations of the communication circuit and control circuit of the wireless power receiving device would be lost, and the device would enter an undesired state where activation and protection are repeatedly conducted. However, with the wireless power receiving device 20 of this embodiment, by changing the capacity of the resonant capacitor, the communication circuit and control circuit can continue the respective operations thereof up to a certain point even with the excessive magnetic field, which allows for stable and safe operation.

The present invention is not limited to the respective embodiments above. For example, in the embodiments above, the transmission resonant circuit and the reception resonant circuit are differential circuits, but one or both of the circuits may be a single-end circuit. In other words, one end of the transmission coil may be connected to the ground (GND), and the other end may be connected to the driving circuit. Alternatively, one end of the receiving coil may be connected to the ground (GND), and the other end thereof may be connected to the rectifier circuit.

Figure 16:
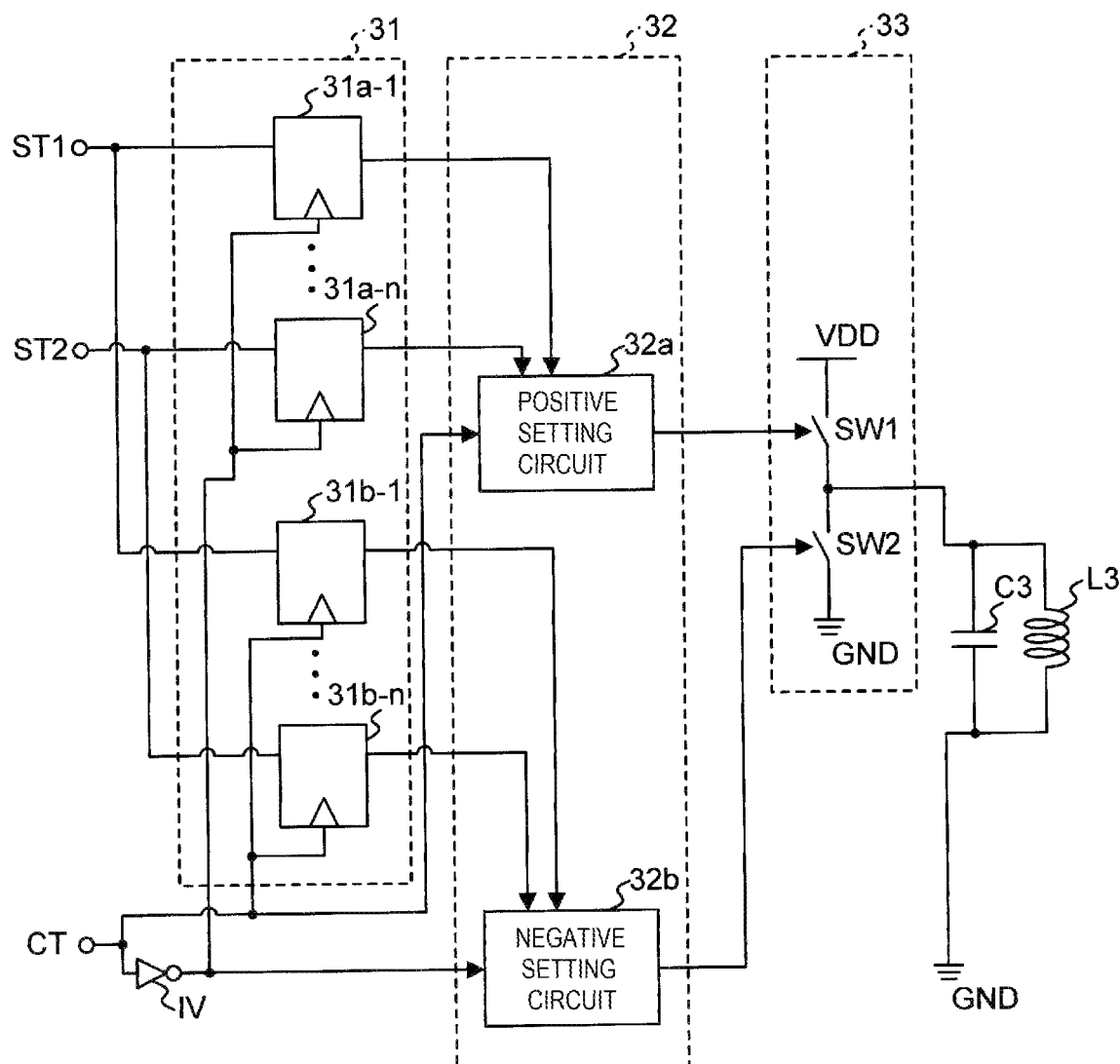
FIG. 16 is a circuit diagram showing the configuration of the wireless power supply device 30 of Embodiment 3 when a driving switch 33 is configured as a single-end type.

In Embodiment 3 described above, the example in which the driving switch 33 was of the differential type was explained. However, as shown with the wireless power supply device 30 of FIG. 16, the driving switch 33 may be of the single-end type.

In the embodiments described above, the transmission resonant circuit and the reception resonant circuit were each a parallel resonant circuit in which the coil (transmission coil or receiving coil) and the resonant capacitor are connected in parallel, but other circuit types such as a series resonant circuit may alternatively be used.

The gradual level change may also be used for a means to send out an ASK modulation signal during communication, in addition to changing the amplitude of the high-frequency current upon switching between the communication operation and the power supply operation.

Embodiment 2 above (FIG. 4) used one rectifier circuit, but it is also possible to use two rectifier circuits each for power supply and for communication. For example, the circuit may be branched at the input side, and one end may be connected to the power supply stabilizing circuit and the other end may be connected to the communication stabilizing circuit.

In Embodiment 4 above, the timing circuit is constituted of flip-flops that operate at the positive phase and negative phase of the AC clock signal of 13.56 MHz, but the configuration of the timing circuit is not limited to this. For example, the AC clock signal of other clock frequencies may be used, or a delay element may be used. That is, any timing adjusting means generally used for a logic circuit may be used.

What is claimed is:

1. A wireless power supply device that alternately performs a wireless communication operation and a wireless power supply operation, comprising:
   a transmission coil configured to generate an AC (alternating current) magnetic field;
   a power supply driving circuit configured to supply a power supply driving current to the transmission coil for generating the AC magnetic field during only the wireless power supply operation, and not during the wireless communication operation; and
   a communication driving circuit configured to supply a communication driving current to the transmission coil for generating the AC magnetic field during both the wireless communication operation and the wireless power supply operation.

2. The wireless power supply device according to claim 1, wherein the communication driving circuit and the power supply driving circuit are connected to the transmission coil in parallel.

3. The wireless power supply device according to claim 1, wherein
   the communication driving circuit and the power supply driving circuit each include:
   a driving switch circuit including a first switch and a second switch, a first AC current flowing through the transmission coil in a first direction when the first switch is turned on, and a second AC current flowing through the transmission coil in a second direction when the second switch is turned on, the second direction opposite to the first direction, the first switch and the second switch being turned on and off in a complementary manner;
   a positive setting circuit that controls the first switch based on a setting signal for setting an amplitude of an AC current, to change an amount of the first AC current flowing through the transmission coil in the first direction;
   a negative setting circuit that controls the second switch based on the setting signal, to change an amount of the second AC current flowing through the transmission coil in the second direction; and
   a timing adjustment circuit that adjusts a first timing at which the positive setting circuit changes the amount of the first AC current flowing through the transmission coil in the first direction and a second timing at which the negative setting circuit changes the amount of the second AC current flowing through the transmission coil in the second direction.

4. The wireless power supply device according to claim 3, wherein the timing adjustment circuit is configured to:
   adjust the first timing such that the positive setting circuit changes the amount of the first AC current flowing through the transmission coil in the first direction when the first switch is turned off; and
   adjust the second timing such that the negative setting circuit changes the amount of the second AC current flowing through the transmission coil in the second direction when the second switch is turned off.

5. The wireless power supply device according to claim 3, wherein the positive setting circuit changes the amount of the first AC current flowing through the transmission coil such that an amplitude of the first AC current gradually changes.

6. The wireless power supply device according to claim 3, wherein the negative setting circuit changes the amount of the second AC current flowing through the transmission coil such that an amplitude of the second AC current gradually changes.

7. The wireless power supply device according to claim 3, wherein the positive setting circuit changes the amount of the first AC current flowing through the transmission coil such that an amplitude of the first AC current changes in accordance with a pseudo-random pattern.

8. The wireless power supply device according to claim 3, wherein the negative setting circuit changes the amount of the second AC current flowing through the transmission coil such that an amplitude of the second AC current changes in accordance with a pseudo-random pattern.

9. The wireless power supply device according to claim 3, wherein
   the first switch and the second switch each include a plurality of transistors that are connected in parallel,
   the positive setting circuit changes a number of transistors, among the plurality of transistors in the first switch to be turned on when the first AC current flows in the first direction, and the negative setting circuit changes the number of transistors, among the plurality of transistors in the second switch to be turned on when the second AC current flows in the second direction.

10. The wireless power supply device according to claim 3, wherein
the first switch includes a first transistor that is turned on and off by a positive pulse applied on a gate thereof,
the second switch includes a second transistor that is turned on and off by a negative pulse applied on a gate thereof,
the setting signal includes a first setting signal and a second setting signal,
the positive setting circuit changes a pulse width of the positive pulse in accordance with the first setting signal, and
the negative setting circuit changes a pulse width of the negative pulse in accordance with the second setting signal.

11. A wireless power transmission system, comprising:
the wireless power supply device according to claim 1; and
a wireless power receiving device that alternately performs the wireless communication operation and a wireless power receiving operation, including:
a receiving coil configured to receive an AC magnetic field to thereby obtain an AC voltage;
a rectifier circuit configured to rectify the AC voltage, thereby to obtain a DC voltage;
a communication stabilizing circuit configured to stabilize the DC voltage, thereby to obtain a communication operation voltage for the wireless communion operation;
a power supply stabilizing circuit configured to stabilize the DC voltage, thereby to receive power in the wireless power receiving operation; and
a communication control circuit configured to receive the communication operation voltage, to perform the wireless communication operation, and to control the power supply stabilizing circuit.

12. A wireless power receiving device that alternately performs a wireless communication operation and a wireless power receiving operation, comprising:
a receiving coil configured to receive an AC (alternating current) magnetic field to thereby obtain an AC voltage;
a rectifier circuit configured to rectify the AC voltage, thereby to obtain a DC voltage;
a communication stabilizing circuit configured to stabilize the DC voltage, thereby to obtain a communication operation voltage for the wireless communion operation;
a power supply stabilizing circuit configured to stabilize the DC voltage, thereby to receive power in the wireless power receiving operation; and
a communication control circuit configured to receive the communication operation voltage, to perform the wireless communication operation, and to control the power supply stabilizing circuit.

13. A wireless power receiving device configured to receive a receiving power from a wireless power supply device, comprising:
a resonant circuit including
a receiving coil configured to receive an AC magnetic field from the wireless power supply device to thereby obtain an AC voltage, and
a resonant capacitor;
a capacity change circuit configured to change a capacity of the resonant capacitor;
a supply line configured to receive a supplied voltage rectified from the AC voltage; and
a current voltage measuring circuit configured to measure a current flowing through the supply line and the supplied voltage, thereby to calculate a receiving power, the capacity change circuit changing the capacity of the resonant capacitor based on whether the calculated receiving power exceeds a prescribed threshold range.

14. A wireless power transmission system that alternately performs a wireless communication operation and a wireless power supply operation, comprising:
a wireless power supply device including
a transmission coil configured to generate an AC magnetic field,
a communication driving circuit configured to supply a communication driving current to the transmission coil, and
a power supply driving circuit configured to supply a power supply driving current to the transmission coil, and
a current measuring circuit configured to measure the power supply driving current; and
the wireless power receiving device according to claim 13.

* * * * *